US010514925B1

(12) United States Patent
Reynolds

(10) Patent No.: US 10,514,925 B1
(45) Date of Patent: Dec. 24, 2019

(54) LOAD SPECULATION RECOVERY

(71) Applicant: Apple Inc., Cupertino, CA (US)

(72) Inventor: Sean M. Reynolds, Cupertino, CA (US)

(73) Assignee: Apple Inc., Cupertino, CA (US)

(*) Notice: Subject to any disclaimer, the term of this patent is extended or adjusted under 35 U.S.C. 154(b) by 502 days.

(21) Appl. No.: 15/009,614

(22) Filed: Jan. 28, 2016

(51) Int. Cl.
*G06F 9/38* (2018.01)
*G06F 9/48* (2006.01)

(52) U.S. Cl.
CPC .......... *G06F 9/3838* (2013.01); *G06F 9/4843* (2013.01)

(58) Field of Classification Search
CPC .... G06F 9/3861; G06F 9/4843; G06F 9/3838; G06F 9/30036; G06F 15/8053
See application file for complete search history.

(56) References Cited

U.S. PATENT DOCUMENTS

| | | |
|---|---|---|
| 4,521,851 A | 6/1985 | Trubisky et al. |
| 4,594,660 A | 6/1986 | Guenthner et al. |
| 4,860,199 A | 8/1989 | Langendorf et al. |
| 5,276,825 A | 1/1994 | Blomgren et al. |
| 5,404,470 A | 4/1995 | Miyake |
| 5,440,752 A | 8/1995 | Lentz et al. |
| 5,465,336 A | 11/1995 | Imai et al. |
| 5,467,473 A | 11/1995 | Kahle et al. |
| 5,471,598 A | 11/1995 | Quattromani et al. |
| 5,475,823 A | 12/1995 | Amerson et al. |
| 5,475,824 A * | 12/1995 | Grochowski ....... G06F 9/30149 712/206 |

(Continued)

FOREIGN PATENT DOCUMENTS

| | | |
|---|---|---|
| EP | 0651323 A1 | 5/1995 |
| EP | 0651331 A1 | 5/1995 |

(Continued)

OTHER PUBLICATIONS

"ARM® Compiler toolchain: Using the Assembler", ARM, Sep. 30, 2011, ARM, 4 pages, http://infocenter.arm.com/help/index.jsp?topic=/com.arm.doc.dui0473c/CEGCCADE.html. [Retrieved Jan. 30, 2015].

(Continued)

*Primary Examiner* — Aimee Li
*Assistant Examiner* — Andrew J Cromer
(74) *Attorney, Agent, or Firm* — Meyertons Hood Kivlin Kowert and Goetzel PC; Rory D. Rankin

(57) ABSTRACT

Systems, apparatuses, and methods for managing dependencies between instruction operations when speculatively issuing load instruction operations. A processor may maintain dependency vectors for sources of instruction operations dispatched to the scheduler. The dependency vector may include a column for each cycle of the load recovery window and a row for each load execution pipeline. When a load speculatively issues, any instruction operation which is dependent on the load may have a bit set in the earliest bit position of its dependency vector to indicate the dependency. The bit may shift in the dependency vector toward the cancel bit position during each clock cycle as the load executes. If the load does not produce its data at the expected latency, an instruction operation may be canceled if there is a bit in the cancel bit position of the dependency vector row corresponding to the execution pipeline of the load.

21 Claims, 13 Drawing Sheets

(56) References Cited

U.S. PATENT DOCUMENTS

| | | | |
|---|---|---|---|
| 5,487,156 | A | 1/1996 | Popescu et al. |
| 5,490,259 | A | 2/1996 | Hiraoka et al. |
| 5,557,763 | A | 9/1996 | Senter et al. |
| 5,606,670 | A | 2/1997 | Abramson et al. |
| 5,619,662 | A | 4/1997 | Steely, Jr. et al. |
| 5,625,789 | A | 4/1997 | Hesson et al. |
| 5,625,835 | A | 4/1997 | Ebcioglu et al. |
| 5,651,125 | A | 7/1997 | Witt et al. |
| 5,652,859 | A | 7/1997 | Mulla et al. |
| 5,666,506 | A | 9/1997 | Hesson et al. |
| 5,710,902 | A | 1/1998 | Sheaffer et al. |
| 5,717,883 | A | 2/1998 | Sager |
| 5,742,791 | A | 4/1998 | Mahalingaiah et al. |
| 5,748,978 | A | 5/1998 | Narayan et al. |
| 5,751,983 | A | 5/1998 | Abramson et al. |
| 5,754,812 | A | 5/1998 | Favor et al. |
| 5,761,712 | A | 6/1998 | Tran et al. |
| 5,768,555 | A | 6/1998 | Tran et al. |
| 5,781,752 | A | 7/1998 | Moshovos et al. |
| 5,781,790 | A | 7/1998 | Abramson et al. |
| 5,799,165 | A | 8/1998 | Favor et al. |
| 5,802,588 | A | 9/1998 | Ramagopal et al. |
| 5,822,559 | A | 10/1998 | Narayan et al. |
| 5,832,297 | A | 11/1998 | Ramagopal et al. |
| 5,835,747 | A | 11/1998 | Trull |
| 5,850,533 | A | 12/1998 | Panwar et al. |
| 5,884,060 | A | 3/1999 | Vegesna et al. |
| 5,884,061 | A | 3/1999 | Hesson et al. |
| 5,887,152 | A | 3/1999 | Tran |
| 5,923,862 | A | 7/1999 | Nguyen et al. |
| 5,996,068 | A | 11/1999 | Dwyer, III et al. |
| 6,016,540 | A | 1/2000 | Zaidi et al. |
| 6,021,485 | A | 2/2000 | Feiste et al. |
| 6,108,770 | A | 8/2000 | Chrysos et al. |
| 6,122,727 | A | 9/2000 | Witt |
| 6,141,747 | A | 10/2000 | Witt |
| 6,212,622 | B1 | 4/2001 | Witt |
| 6,212,623 | B1 | 4/2001 | Witt |
| 6,266,744 | B1 | 7/2001 | Hughes et al. |
| 6,393,536 | B1 | 5/2002 | Hughes et al. |
| 6,481,251 | B1 | 11/2002 | Meier et al. |
| 6,502,185 | B1 | 12/2002 | Keller et al. |
| 6,523,109 | B1 | 2/2003 | Meier |
| 6,542,984 | B1 | 4/2003 | Keller et al. |
| 6,571,267 | B1* | 5/2003 | Yoshioka ............... G06F 5/012 708/505 |
| 6,571,318 | B1 | 5/2003 | Sander et al. |
| 6,622,237 | B1 | 9/2003 | Keller et al. |
| 6,625,723 | B1 | 9/2003 | Jourday et al. |
| 6,651,161 | B1 | 11/2003 | Keller et al. |
| 6,658,554 | B1 | 12/2003 | Moshovos et al. |
| 6,658,559 | B1 | 12/2003 | Arora et al. |
| 6,678,807 | B2 | 1/2004 | Boatright et al. |
| 6,694,424 | B1 | 2/2004 | Keller et al. |
| 6,728,867 | B1 | 4/2004 | Kling |
| 6,918,030 | B2 | 7/2005 | Johnson |
| 7,062,617 | B2 | 6/2006 | Dundas |
| 7,181,598 | B2 | 2/2007 | Jourdan et al. |
| 7,376,817 | B2 | 5/2008 | Kadambi et al. |
| 7,415,597 | B2 | 8/2008 | Filippo et al. |
| 9,128,725 | B2 | 9/2015 | Meier et al. |
| 2002/0178349 | A1 | 11/2002 | Shibayama et al. |
| 2003/0065909 | A1 | 4/2003 | Jourdan |
| 2003/0126409 | A1 | 7/2003 | Juan et al. |
| 2003/0196074 | A1* | 10/2003 | Le ............... G06F 9/3836 712/218 |
| 2003/0217251 | A1 | 11/2003 | Jourdan et al. |
| 2005/0268075 | A1 | 12/2005 | Caprioli et al. |
| 2006/0095734 | A1 | 5/2006 | Filippo et al. |
| 2006/0248281 | A1 | 11/2006 | Al-Sukhni et al. |
| 2007/0088935 | A1* | 4/2007 | Feiste ............... G06F 9/3836 712/218 |
| 2007/0226470 | A1 | 9/2007 | Krimer et al. |
| 2007/0288726 | A1 | 12/2007 | Luick |
| 2008/0183986 | A1 | 7/2008 | Yehia et al. |
| 2009/0083263 | A1 | 3/2009 | Felch et al. |
| 2009/0187727 | A1 | 7/2009 | Caprioli et al. |
| 2010/0205384 | A1 | 8/2010 | Beaumont-Smith et al. |
| 2010/0293347 | A1 | 11/2010 | Luttrell |
| 2010/0325395 | A1 | 12/2010 | Burger et al. |
| 2011/0138149 | A1 | 6/2011 | Karlsson et al. |
| 2011/0143811 | A1 | 6/2011 | Rodriguez |
| 2011/0153986 | A1 | 6/2011 | Alexander et al. |
| 2013/0326198 | A1 | 12/2013 | Meier et al. |
| 2014/0223144 | A1* | 8/2014 | Heil ............... G06F 9/30043 712/214 |
| 2015/0089191 | A1* | 3/2015 | Gonion ............... G06F 9/30036 712/7 |

FOREIGN PATENT DOCUMENTS

| | | |
|---|---|---|
| EP | 0709770 A2 | 5/1996 |
| EP | 0727737 A2 | 8/1996 |
| GB | 2281442 A | 3/1995 |
| TW | 200841238 A | 10/2008 |
| TW | 201003516 A | 1/2010 |
| TW | 201033898 A1 | 9/2010 |
| WO | 96/12227 A1 | 4/1996 |
| WO | 97/27538 A1 | 7/1997 |
| WO | 0150252 A1 | 7/2001 |
| WO | 2006/028555 A2 | 3/2006 |

OTHER PUBLICATIONS

Chrysos et al., "Memory Dependence Prediction Using Store Sets", Proceedings of the 25th Annual International Symposium on Computer Architecture, Apr. 16, 1998, 12 pages, IEEE Computer Society, Washington, DC, USA.

Communication pursuant to Article 94(3) EPC in European Application No. 13165284.4, dated Jul. 23, 2014, 6 pages.

"Dynamic Scheduling", Jul. 13, 2010, 11 pages, http://www.ece.unm.edu/~jimp/611/slides/chap4_4.html. [Retrieved Jan. 30, 2015].

Extended Search Report in EP Application No. 13165284.4, dated Sep. 30, 2013, 9 pages.

Final Office Action in Japanese Patent Application No. 2013-096795, dated Mar. 4, 2015, 19 pages.

Final Office Action in U.S. Appl. No. 13/483,268, dated Jun. 15, 2015, 12 pages.

Gopal et al., "Speculative Versioning Cache", In Proceedings of the 4th International Symposium on High-Performance Computer Architecture, Jan. 1998, 11 pages, IEEE Computer Society, Washington, DC, USA.

Gwennap, Linley, "Digital 21264 Sets New Standard: Clock Speed, Complexity, Performance Surpass Records, But Still a Year Away", Microdesign Resources, Oct. 28, 1996, 6 pages, vol. 10, No. 14.

International Search Report and Written Opinion in application No. PCT/US2013/037809 dated Sep. 10, 2013, 16 pages.

International Search Report and Written Opinion in application No. PCT/US2013/041852 dated Sep. 30, 2013, 14 pages.

Jacob, Bruce, "The RiSC-16 Instruction-Set Architecture", 2000, 4 pages, http://www.eng.umd.edu/~blj/RiSC/RiSC-isa.pdf. [Retrieved on Jan. 30, 2015].

Jaleel et al., "Using Virtual Load/Store Queues (VLSQs) to Reduce the Negative Effects of Reordered Memory Instructions", In the Proceedings of the 11th International Symposium on High-Performance Computer Architecture, Feb. 2005, 10 pages, IEEE Computer Society, Washington, DC, USA.

Kubiatowicz, John, "Reorder Buffers and Explicit Register Renaming", Sep. 22, 2000, 55 pages, http://www.cs.berkeley.edu/~kubitron/courses/cs252-F00/lectures/lec07-renamereorder.ppt. [Retrieved Feb. 5, 2015].

Johnson, Mike, "Chapter 7: Out-of-Order Issue", Superscalar Microprocessor Design, Advanced Micro Devices, Inc., 1991, pp. 127-129, Prentice-Hall, Inc., Englewood Cliffs, NJ, USA.

Leibholz, et al., "The Alpha 21264: A 500 MHz Out-of Order Execution Microprocessor", Proceedings of the 42nd IEEE International Computer Conference, Feb. 1997, pp. 28-36, IEEE Computer Society Press, Los Alamitos, CA, USA.

(56) References Cited

OTHER PUBLICATIONS

Moshovos et al., "Dynamic Speculation and Synchronization of Data Dependences", Proceedings of the 24th Annual International Symposium on Computer Architecture, Jun. 1, 1997, 13 pages, ACM, New York, NY, USA.
Moshovos et al., "Speculative Memory Cloaking and Bypassing", International Journal of Parallel Programming, Dec. 1999, 15 pages, Kluwer Academic Publishers, Norwell, MA, USA.
Moshovos et al., "Streamlining Inter-operation Memory Communication via Data Dependence Prediction", In Proceedings of the 30th International Symposium on Microarchitecture, Dec. 1997, 11 pages, IEEE Computer Society, Washington, DC, USA.
Non-Final Office Action in U.S. Appl. No. 13/483,268, dated Feb. 23, 2015, 28 pages.
Notice of Last Preliminary Rejection in Korean Patent Application No. 10-2013-49975, dated Feb. 9, 2015, 4 pages.
Notice of Preliminary Rejection in Korean Patent Application No. 10-2013-49975, dated Jul. 23, 2014, 11 pages.
Notification of the First Office Action in Chinese Application No. 201310323392.0, dated May 4, 2015, 33 pages.
Office Action in Japanese Patent Application No. 2013-096795, dated Aug. 18, 2014, 27 pages.
Office Action in Taiwan Patent Application No. 102115961, dated Nov. 20, 2014, 23 pages.
Office Action in Taiwan Patent Application No. 102119009, dated Feb. 13, 2015, 6 pages.
Popescu et al., "The Metaflow Architecture", IEEE Micro, Jun. 1991, pp. 10-13 and 63-73, IEEE Computer Society Press, Los Alamitos, CA, USA.
Reinman, et al. "Predictive Techniques for Aggressive Load Speculation", In the Proceedings of the Annual 31st International Symposium on Microarchitecture, Dec. 1998, pp. 127-137, IEEE Computer Society Press, Los Alamitos, CA, USA.
Jamil, Tariq, "RAM versus CAM", 1997, IEEE, 0278-6648/97, pp. 26-29, http://ieeexplore.ieee.org/stamp/stamp.jsp?tp=&arnumber=580445. [Retrieved on Feb. 5, 2015].
Kim, et al., "Understanding Scheduling Replay Schemes", Proceedings of the 10th International Symposium on High Performance Computer Architecture, Feb. 14, 2004, 12 pages, IEEE Computer Society, Washington, DC, USA.

\* cited by examiner

LOAD SPECULATION RECOVERY

BACKGROUND

Technical Field

Embodiments described herein relate to the field of processors and more particularly, to handling load dependencies in a processor.

Description of the Related Art

A processor includes hardware circuitry designed to execute instructions defined by a particular instruction set architecture. Processors generally include support for load and store memory operations to facilitate transfer of data between the processors and memory to which the processors may be coupled. A load memory operation (or, more briefly, a load) is a memory operation specifying a transfer of data from a main memory to the processor (although the transfer may be completed in cache). A store memory operation (or, more briefly, a store) is a memory operation specifying a transfer of data from the processor to memory. Loads and stores may be an implicit part of an instruction which includes a memory operation, or may be explicit instructions.

A given load will often have one or more instructions which are dependent on the data produced by the given load. These instructions may be referred to as being directly dependent on the given load. Additionally, there may be additional instructions which are dependent on the data produced by those instructions which are directly dependent on the given load. These additional instructions may be referred to as being indirectly dependent on the given load. Accordingly, the given load may have multiple levels of dependent instructions.

The latency for a load to produce its data may vary from load to load, based on where the targeted data is located (e.g., L1 cache, L2 cache, memory). However, to allow for the most efficient scheduling of instructions, a processor may assume that a load will produce its data at the shortest possible latency when scheduling dependent (directly or indirectly) instructions which are dependent directly or indirectly on the load.

When a load is able to produce its data at the shortest possible latency, then the dependent instructions may continue to execute as previously scheduled. However, when the load is not able to produce its data at the shortest possible latency, the processor needs a mechanism for processing instructions dependent on the load.

SUMMARY

Systems, apparatuses, and methods for managing load speculation recovery are contemplated.

A processor may include a scheduler for scheduling instruction operations and one or more execution pipelines for executing instructions. The scheduler may utilize dependency vectors to track dependencies for sources of instruction operations which are in-flight. Each source dependency vector may include a plurality of bit positions (or slots) for storing dependency indicators to indicate if the source is dependent either directly or indirectly on an in-flight load and to indicate the current pipeline stage of the in-flight load. In one embodiment, there may be a row in the source dependency vector for each load execution pipeline. There may also be a bit position (or column) in each row for each cycle of the load recovery window. The term "load recovery window" may be defined as the number of clock cycles between when a load speculatively issues and when the load will be cancelled (in response to the load missing in the cache) for a given load execution pipeline. The values in the dependency vector bit positions may shift forward on each clock cycle. The early bit positions may be referred to as propagate bit positions and the last bit position may be referred to as the "kill" or "cancel" bit position or the kill/cancel bit. In some embodiments, more than one bit position per row may be considered a kill/cancel bit. In these embodiments, some bit positions may be marked as both kill bits and propagate bits.

When the kill bit of a given dependency vector is set for a first load execution pipeline and a kill or cancel signal is generated for a load in the first load execution pipeline, then the instruction operation corresponding to the given dependency vector may be killed if the instruction operation has already issued. Also, the source corresponding to the given dependency vector may be marked as unready and wait for a new wake-up signal. An instruction or its source may be marked as unready even if the instruction has already issued.

The processor may speculate that loads will receive their data at the earliest possible latency assuming the data for the load is in the cache. When a given load misses in the cache, then the given load may be cancelled and a kill signal may be generated for all dependent instruction operations. When a kill signal for a load is generated, the kill signal may be sent to all sources and instruction operations in the scheduler. In response to receiving the kill signal, the scheduler may examine each dependency vector to determine if the kill bit indicates a dependency on the kill signal. If an instruction has a set kill bit in its dependency vector, then the instruction may be killed (i.e., cancelled). If an instruction has one or more set propagate bits, but the instruction does not have a set kill bit, then the instruction will not be cancelled. If a source has a set kill bit in its dependency vector, then the source may be marked as unready and await a new wake-up signal.

In one embodiment, when the processor issues a given instruction operation, the processor may be configured to generate an instruction dependency vector from the disjunction of all of the given instruction operation's source dependency vectors. Additionally, in response to issuing the given instruction operation, the processor may wake-up any sources which are dependent on the given instruction operation. When a source is woken up, the source's dependency vector may be updated by the disjunction of the dependency vector of the given instruction operation with the existing source's dependency vector. Then, the source's dependency vector may be shifted one bit forward. If the given instruction operation is a load instruction operation, then the earliest bit of the row corresponding to the load execution pipeline on which the load was issued of the source's dependency vector may be set.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

Figure 1:
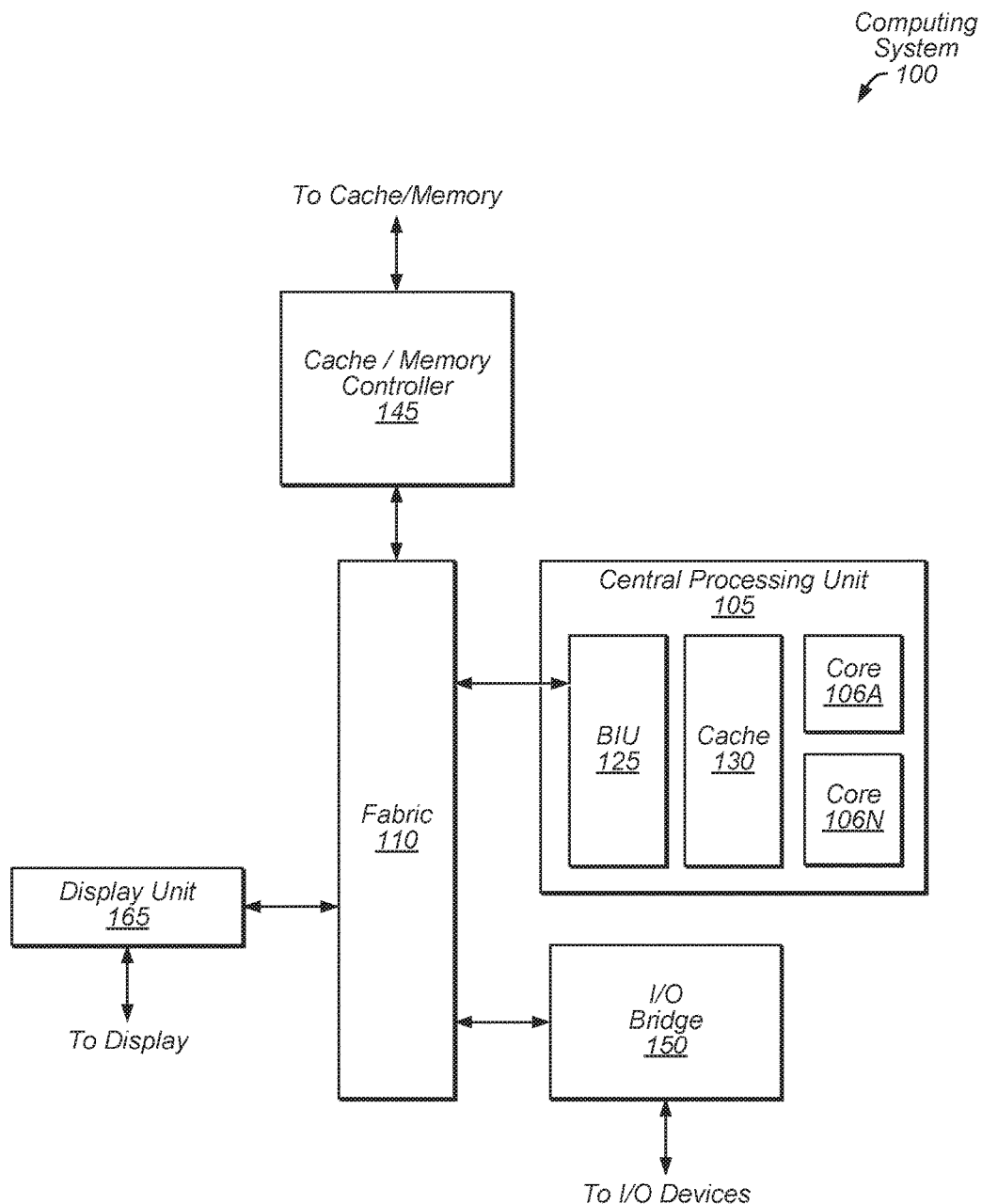
FIG. 1 is a block diagram illustrating one embodiment of a computing system.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A system comprising a processor . . . ." Such a claim does not foreclose the system from including additional components (e.g., a display, a memory controller).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, a block diagram illustrating one embodiment of a computing system 100. In some embodiments, some or all elements of the computing system 100 may be included within a system on a chip (SoC). In some embodiments, computing system 100 may be included in a mobile device. In the illustrated embodiment, the computing system 100 includes fabric 110, central processing unit (CPU) 105, input/output (I/O) bridge 150, cache/memory controller 145, and display unit 165. Although the computing system 100 illustrates central processing unit 105 as being connected to fabric 110 as a sole central processing unit of the computing system 100, in other embodiments, central processing unit 105 may be connected to or included in other components of the computing system 100 and other central processing units may be present. Additionally or alternatively, the computing system 100 may include multiple central processing units 105. The multiple central processing units 105 may include different units or equivalent units, depending on the embodiment.

Fabric 110 may include various interconnects, buses, MUXes, controllers, etc., and may be configured to facilitate communication between various elements of computing system 100. In some embodiments, portions of fabric 110 may be configured to implement various different communication protocols. In other embodiments, fabric 110 may implement a single communication protocol and elements coupled to fabric 110 may convert from the single communication protocol to other communication protocols internally.

In the illustrated embodiment, central processing unit 105 includes bus interface unit (BIU) 125, cache 130, and cores 106A and 106N. In various embodiments, central processing unit 105 may include various numbers of cores and/or caches. For example, central processing unit 105 may include 1, 2, or 4 processor cores, or any other suitable number. In some embodiments, cores 106A and/or 106N include internal instruction and/or data caches. In some embodiments, a coherency unit (not shown) in fabric 110, cache 130, or elsewhere in computing system 100 may be configured to maintain coherency between various caches of computing system 100. BIU 125 may be configured to manage communication between central processing unit 105 and other elements of computing system 100. Processor cores such as cores 106A and 106N may be configured to execute instructions of a particular instruction set architecture (ISA), which may include operating system instructions and user application instructions.

Cache/memory controller 145 may be configured to manage transfer of data between fabric 110 and one or more caches and/or memories (e.g., non-transitory computer readable mediums). For example, cache/memory controller 145 may be coupled to an L3 cache, which may, in turn, be coupled to a system memory. In other embodiments, cache/memory controller 145 may be directly coupled to a memory. In some embodiments, the cache/memory controller 145 may include one or more internal caches.

Display unit 165 may be configured to read data from a frame buffer and provide a stream of pixel values for display. Display unit 165 may be configured as a display pipeline in some embodiments. Furthermore, display unit 165 may include one or more interfaces (e.g., MIPI® or embedded display port (eDP)) for coupling to a user display (e.g., a touchscreen or an external display). I/O bridge 150 may include various elements configured to implement: universal serial bus (USB) communications, security, audio, and/or low-power always-on functionality, for example. I/O bridge 150 may also include interfaces such as pulse-width modulation (PWM), general-purpose input/output (GPIO), serial peripheral interface (SPI), and/or inter-integrated circuit (I2C), for example. Various types of peripherals and devices may be coupled to computing system 100 via I/O bridge 150. In some embodiments, central processing unit 105 may be coupled to computing system 100 via I/O bridge 150.

Figure 2:
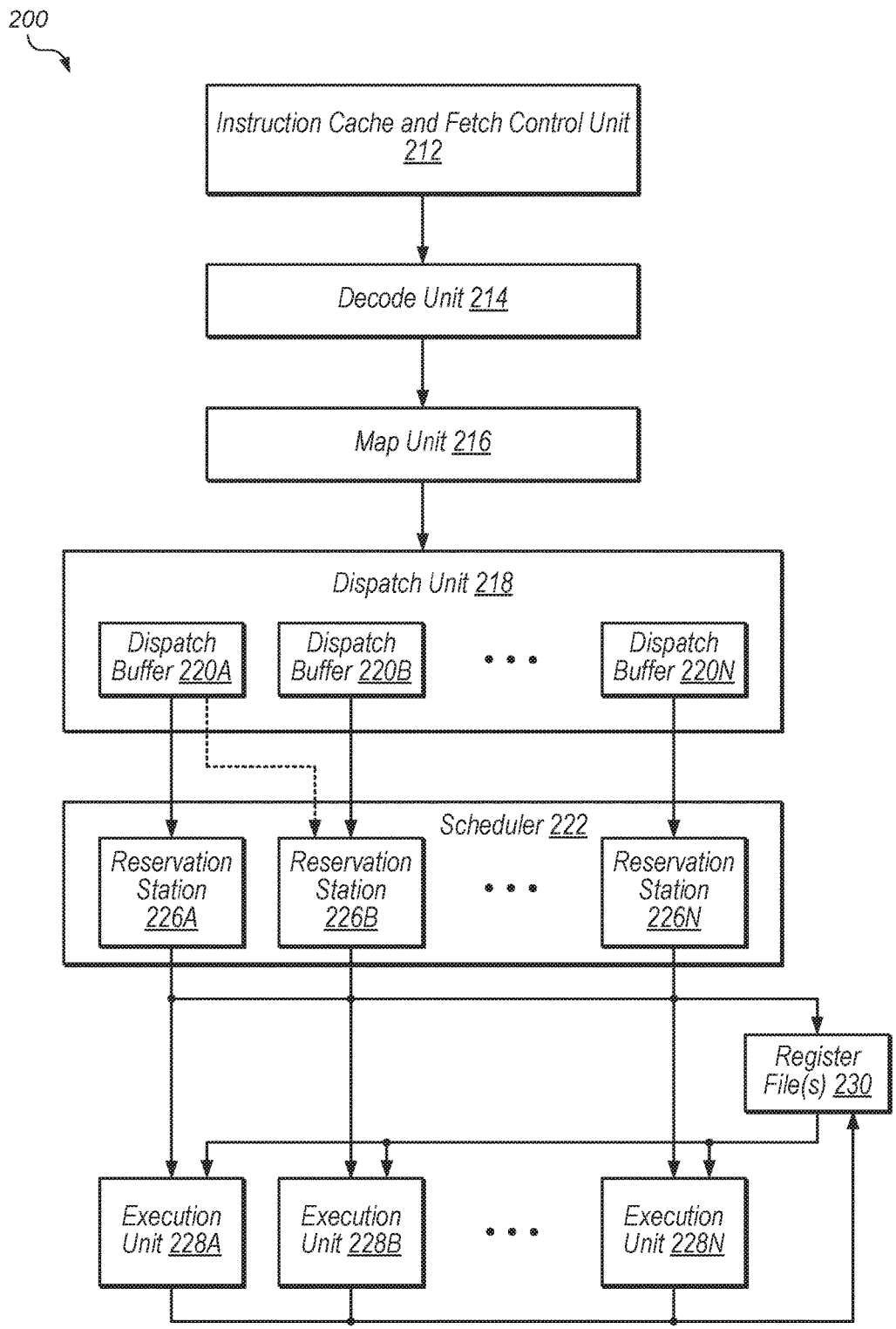
FIG. 2 is a block diagram of one embodiment of a portion of a processor.

Turning now to FIG. 2, a block diagram of one embodiment of a portion of a processor 200 is shown. In the illustrated embodiment, the processor 200 includes an instruction cache and fetch control unit 212, a decode unit 214, a map unit 216, a dispatch unit 218, a scheduler 222 with a set of reservation stations 226A-226N, a set of execution units 228A-228N, and one or more register files 230. The instruction cache and fetch control unit 212 is coupled to the decode unit 214, which is coupled to the map unit 216. The map unit 216 is coupled to the dispatch unit 218, which is further coupled to the reservation stations 226A-226N in scheduler 222. The reservation stations 226A-226N are coupled to respective execution units 228A-228N and the register file(s) 230. The register file(s) 230 are further coupled to the execution units 228A-228N. It is noted that processor 200 may include other components and interfaces not shown in FIG. 2. In various embodiments, the logic of processor 200 may be included in one or more of cores 106A-N of CPU 105 (of FIG. 1).

In one embodiment, the dispatch unit 218 may include a set of dispatch buffers 220A-220N, which are representative of any number of dispatch buffers. Each of the dispatch buffers 220A-220N may be coupled to a corresponding reservation station 226A-226N. For example, dispatch buffer 220A is coupled to reservation station 226A. Additionally, in some embodiments, dispatch buffer 220A may also be coupled to reservation station 226B and/or one or more other reservation stations. Similarly, dispatch buffer 220B is coupled to reservation station 226B and may also be coupled to one or more other reservation stations. It should be understood that any configuration of dispatch buffers and reservation stations may be utilized depending on the embodiment. For example, in another embodiment, each dispatch buffer 220 may be coupled to two separate reservation stations 226. Other embodiments may implement more than two reservation stations per dispatch buffer 220, if desired.

Instruction operations may be captured by the dispatch buffers 220A-220N based on the type of instruction operation (e.g. integer, load/store, or floating point). In some embodiments, a given instruction may be decoded into one or more instruction operations, depending on the complexity of the instruction. Particularly complex instructions may be microcoded, in some embodiments. In such embodiments, the microcode routine for the instruction may be coded in micro-ops (μops). In other embodiments, each instruction in the instruction set architecture implemented by the processor 200 may be decoded into a single instruction operation, and thus the instruction operation may be essentially synonymous with the instruction (although it may be modified in form by decode unit 214). For the purposes of simplicity, the terms "instruction operation", "op", and "μop" may be used interchangeably herein.

In one embodiment, load/store μμops may be captured by dispatch buffer 220A, which may be coupled to a load/store reservation station 226A, which may be further coupled to a load/store execution unit 228A. In this embodiment, integer μops may be captured by the dispatch buffer 220B and floating point μops may be captured by dispatch buffer 220N. Alternatively, in another embodiment, dispatch buffer 220A may be coupled to two load/store reservation stations 226A-B, which may each be coupled to corresponding load/store execution units 228A-B. More than one integer reservation station and/or more than one floating point reservation station may also be utilized, depending on the embodiment. It is noted that execution units 228A-N may also be referred to herein as "execution pipelines".

The instruction cache and fetch control unit 212 may be configured to cache instructions previously fetched from memory, and may be configured to speculatively fetch a stream of instructions for the processor 200. The instruction cache and fetch control unit 212 may implement various prediction structures to predict the fetch stream. For example, a next fetch predictor may be used to predict fetch addresses based on previously executed instruction streams. Branch predictors of various types may be used to verify the next fetch prediction, or may be used to predict next fetch addresses if the next fetch predictor is not used.

The decode unit 214 may be configured to decode the instructions into ops or μops that are executable by the execution units 228A-228N. The map unit 216 may be configured to perform register renaming on the μops, assigning physical registers in the register files 230 for each source and destination register in the μops. In one embodiment, map unit 216 may be configured to generate dependency vectors for the μops, wherein the dependency vectors identify the μops on which a given μop is dependent. The map unit 216 may provide the dependency vectors for each μop to dispatch unit 218 and/or scheduler 222. Scheduler 222 may be configured to maintain the dependency vectors and to update the dependency vectors as additional dependencies are discovered and/or when more precise timing of the dependencies between μops is determined.

In one embodiment, the reservation stations 226A-226N may each store µops to be executed by a corresponding execution unit 228A-228N. Each reservation station 226A-226N may include an entry for each µop dispatched to the reservation station 226A-226N. When a given µop is dispatched to a given reservation station 226A-226N, the given µop may be stored in an entry of the given reservation station 226A-226N. In various embodiments, an entry may be ready to be issued if all of the µop's sources have been woken up (i.e., are ready). After the given µop is issued to a corresponding execution unit 228A-228N, the given µop may remain stored in its entry in the given reservation station 226A-226N until after the given µop can no longer be cancelled.

In various embodiments, the reservation stations 226A-226N may be configured to track dependencies of the µops stored therein, and may be configured to schedule µops for which the dependencies have been satisfied (or are currently being satisfied by an executing µop which will forward the result data to the µop). In this embodiment, the reservation stations 226A-226N may track dependencies but may not actually capture operand data. Instead, register files 230 may be used to read the operand data (and there may be forwarding paths for results generated by the execution units 228A-228N). Thus, the reservation stations 226A-226N may include storage implementing a number of entries for µops (e.g., random access memory arrays, flops, registers) as well as control circuitry configured to track/resolve dependencies and to schedule µops. Other embodiments may be configured to capture the operand data in the reservation stations as well. In such embodiments, the register files 230 may be read as each µop enters the reservation stations 226A-226N, and forwarded results may be captured by the reservation stations 226A-226N in addition to the register files 230 updating with the forwarded results.

In one embodiment, µops that are dependent on load µops may be scheduled for execution assuming that the load µops will hit in the cache (not shown) or the store queue (not shown). In various embodiments, there may be a several cycle window of time for each load µop until the hit/miss is known, and µops that are scheduled in this window need to be re-executed if they depend (directly or indirectly) on the load µop and the load µop is a miss. This window of time may be referred to herein as a "load recovery window". Accordingly, µops may be held in a reservation station 226 for a number of cycles after they are issued to be able to rollback the reservation station 226 in case of a shadow replay. In various embodiments, a dependency check may be performed for determining dependencies between µops being processed by processor 200. In one embodiment, a load-store execution unit may include a load queue (not shown) and store queue (not shown), and a dependency check may be implemented by performing content-addressable-memory (CAM) accesses of the load queue and/or store queue to compare addresses between in-flight load and store µops. In another embodiment, determining a dependency between a producing µop and a consuming µop may occur prior to or during a register renaming stage in processor 200. For example, the destination register of a first µop may be determined to match the source register of a second µop. In other embodiments, dependencies between in-flight µops may be determined using other suitable techniques.

In one embodiment, scheduler 222 may maintain a load dependency matrix (or dependency vector) for every source value of every instruction inside scheduler 222. This matrix may contain one bit for each pipeline stage inside a contiguous range (i.e., the load recovery window) for each load execution lane. The range may begin with the earliest pipeline stage in which an instruction that is data-dependent on a load may have been awoken. The range ends with the final pipeline stage in which a load cancel signal may be received by scheduler 222. In general, different sources and different instructions may have differently-sized matrices. Furthermore, the size of the range may not be the same for each load execution lane, in which case the matrix would not be rectangular.

After a load begins executing, the load may send a wakeup signal to all data-dependent instructions inside scheduler 222. Each dependent source of each dependent instruction may mark the earliest bit for the matching pipeline in its load dependency matrix as load-dependent. The load dependency matrix is shifted forward by one stage after each cycle. The earliest bit positions are marked as load-independent, except when a new load is issued and sends a wakeup signal to the source. Dependency information may be lost after the final stage. When any instruction (including load instructions) begins executing, the instruction may combine all of its load dependency matrices (for all of it sources) into a single matrix. The instruction may achieve this by taking the disjunction of all of the separate matrices. Taking the disjunction involves performing an OR operation on a given (lane, stage) bit of each of the separate source matrices, and then performing this OR operation for all (lane, stage) bits of the matrices. In other words, if a particular (lane, stage) bit is marked as load-dependent for any source, then that bit will be marked as load-dependent for the instruction. This matrix may then be broadcast to all data-dependent instructions inside scheduler 222. Each bit of the matrix that is marked as data-dependent may then be marked accordingly in each dependent source of each dependent instruction.

Loads that fail to produce data at a predicted latency may send one or more cancellation signals at fixed pipeline stages. These cancellation signals may be broadcast to all instructions inside scheduler 222. Each source of each instruction may mark itself unready whenever its dependency matrix indicates a dependency on the execution lane and pipeline stage that produced the cancellation signal. If an instruction is affected by a load cancellation signal, then any of its dependents that would wake up in the same cycle may be cancelled in a manner that prevents those dependents from waking up any further instructions. Thus, the wavefront of dependent instruction issue events will be bounded. No dependent instruction may issue after the final cancellation signal is broadcast to scheduler 222 until another wakeup signal is received. In some embodiments, there may be some number of additional cycles before scheduler 222 completes processing of a received cancellation signal. In these embodiments, it may be possible for a dependent instruction to issue after the cancellation signal is sent to scheduler 222. However, after the cancellation signal is fully processed by scheduler 222, any dependent instructions would not be allowed to issue.

The register files 230 may be one or more sets of physical registers which may be mapped to the architected registers coded into the instructions stored in the instruction cache and fetch control unit 212. There may be separate physical registers for different operand types (e.g., integer, media, floating point) in an embodiment. In other embodiments, the physical registers may be shared over operand types. The register files 230 may be configured to output operands read in response to µops issued for execution by the reservation stations 226A-226N to the respective execution units 228A-228N. The register files 230 may also be configured to capture results generated by the execution units 228A-228N and written to the destination registers of the µops.

One or more of execution units 228A-228N may be an integer execution unit which is configured to execute integer µops. Generally, an integer µop is a µop which performs a defined operation on integer operands. Integers may be numeric values in which each value corresponds to a mathematical integer. Different circuitry may be allocated to different ones of execution units 228A-228N for performing different types of operations on integer operands. For example, a first execution unit 228 may include a multiplier, a second execution unit 228 may include a divider, a third execution unit 228 may include branch processing hardware to process branch µops, and so on. In one embodiment, each of the integer execution units may include adder hardware, shift/rotate hardware, logical operation hardware, etc. to perform dynamically-assigned integer operations.

One or more of execution units 228A-228N may be a load/store execution unit which is configured to execute load/store µops. Generally, a load µop may specify a transfer of data from a memory location to a register, while a store µop may specify a transfer of data from a register to a memory location. The load/store execution unit(s) may include load queues, store queues, and/or load/store queues to handle load/store µops that have generated memory addresses but are awaiting cache fills or to commit data to the cache or memory. A data cache, not shown, may be coupled to the load/store execution units and may be accessed to complete load/store µops without transmission to the memory subsystem in the case of a cache hit.

One or more of execution units 228A-228N may be a floating point execution unit which is configured to execute floating point µops. Generally, floating point µops may be µops that have been defined to operate on floating point operands. A floating point operand is an operand that is represented as a base raised to an exponent power and multiplied by a mantissa (or significand). The exponent, the sign of the operand, and the mantissa/significand may be represented explicitly in the operand and the base may be implicit (e.g. base 2, in an embodiment).

Each execution unit may comprise hardware configured to perform the operations defined for the µops that the particular execution unit is defined to handle. The execution units may generally be independent of each other, in the sense that each execution unit may be configured to operate on a µop that was issued to that execution unit without dependence on other execution units. Viewed in another way, each execution unit 228A-228N may be an independent pipe for executing µops. The reservation stations 226A-226N may be part of the independent pipe with the corresponding execution unit 228A-228N.

Figure 3:
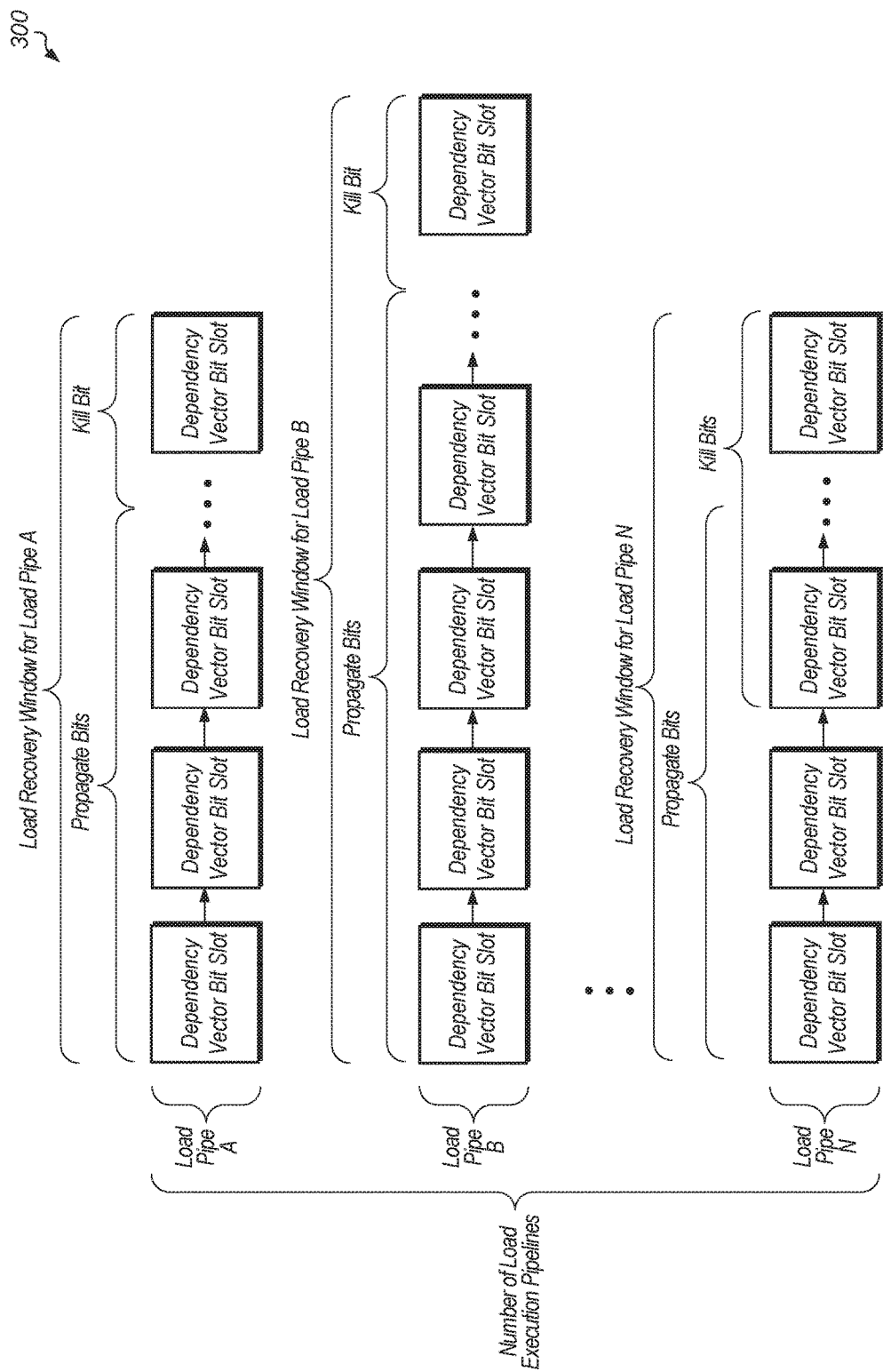
FIG. 3 is a block diagram of one embodiment of a dependency vector.

Referring now to FIG. 3, a block diagram of one embodiment of a dependency vector 300 is shown. In one embodiment, for each load execution pipeline in the processor, dependency vector 300 may include a row of bit positions. Accordingly, dependency vector 300 may include 'N' rows corresponding to 'N' load execution pipelines in the processor, wherein 'N' is a positive integer. Additionally, dependency vector 300 may include a bit position in a given row for each cycle of the load recovery window for the corresponding load execution pipeline. In one embodiment, the load recovery window may be defined as the number of clock cycles between when a load speculatively issues and when the load will be cancelled (in response to the load missing in the cache) for the given load execution pipeline. The length of the load recovery window may vary from load execution pipeline to load execution pipeline. If the load recovery window is different for particular load execution pipelines, then dependency vector 300 will be a non-symmetrical vector with rows of different lengths.

Each source of each instruction in the scheduler may have a corresponding dependency vector. In one embodiment, when a given load executes, the dependency vector of any instruction directly dependent on the given load may have a '1' bit stored in the left-most (or earliest) bit position of the row corresponding to the load pipeline on which the given load is executing. The arrows from left to right between the dependency vector bit positions indicate that the bit value stored in the dependency vector bit positions shifts from left to right for each clock cycle. It is noted that in another embodiment, the meaning of '1' and '0' bits stored in the dependency vector may be reversed, such that a '0' indicates a dependency and a '1' indicates no dependency. Additionally, it is noted that a dependency vector may also be referred to as a dependency matrix.

The earlier bits in a row of dependency vector 300 are referred to as the propagate bits. These bits will shift to the right (one bit per clock cycle) and eventually reach the kill (or cancel) bit position which is the right-most (or latest) bit position in the row. If the scheduler receives a signal from a given load pipe that the load executing in that pipe mis-speculated, then the scheduler may look at the kill bit position of the row corresponding to the load pipe in the dependency vector 300 of each source of each instruction entry in the scheduler. It is noted that entries remain in the scheduler for issued instructions until these instructions have passed the point at which they could be killed or canceled. If a source has a '1' bit in the kill bit position of the row corresponding to the load pipe which generated the kill or cancel signal, then the source may be marked as not ready in the scheduler so that it will wait for a new wake-up signal. It is noted that in some embodiments, more than one bit position per row may be considered a kill/cancel bit. In these embodiments, some bit positions may be marked as both kill bits and propagate bits. Additionally, the number of kill bits may differ among the load execution pipelines, with some of the load execution pipelines having more than one kill bit. For example, load execution pipeline N may include multiple kill bits, with one or more bit positions marked as both kill bit positions and propagate bit positions. In general, when multiple kill bits exist, these multiple kill bits may be contiguous, although they are not required to be contiguous.

In another embodiment, an implementation could optionally clear a kill bit after successfully matching the kill bit with a kill signal. Therefore, a kill bit in a propagate bit position may be permitted to disappear before shifting out of the right side of its row vector. In some embodiments, there may be multiple kill/cancel signals that can be sent by a load execution pipeline. These signals may be broadcast to the scheduler in the same cycle or in different cycles. In some cases, the number of kill/cancel signals may not match the number of kill/cancel bits. The number of kill/cancel signals may be greater than, less than, or equal to the number of kill/cancel bits. For example, there may be one kill bit that is examined by two cancel signals. The scheduler may need to look at multiple bit positions in a dependency matrix when a kill signal is sent. Different kill signals may examine different numbers of bits or different sets of bits. These bit positions may reside anywhere in the dependency matrix, and they may include propagate bit positions as well as kill bit positions. These bit positions may reside in the same row as each other. These bit positions may also reside in multiple rows. Depending on the embodiment, the function performed on these bit positions may be more complex than a disjunction or a conjunction operation. In some cases, the scheduler may look at bit positions outside of the dependency matrix when a kill signal is sent. For example, a function of the dependency matrix may be computed in the previous cycle and stored separately for use in the shadow kill logic.

Figure 4:
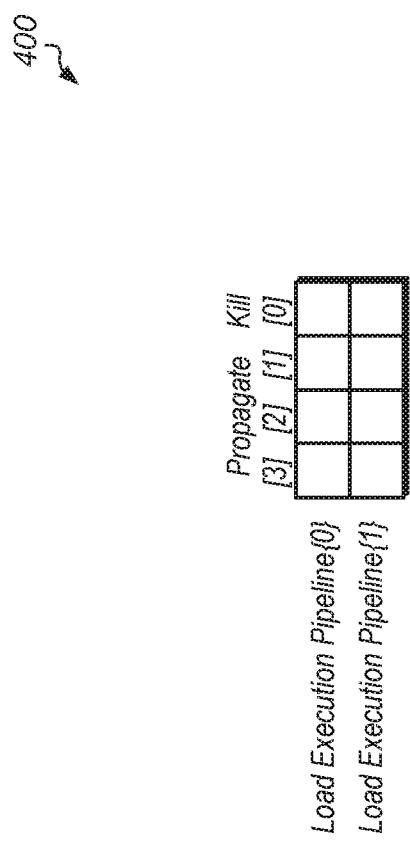
FIG. 4 is a block diagram of one embodiment of a dependency vector.

Turning now to FIG. 4, a block diagram of one embodiment of a dependency vector 400 is shown. Dependency vector 400 is indicative of one possible implementation of a dependency vector to be used for tracking multiple levels of dependencies between a source of an instruction and earlier instructions upon which the source is dependent. In one embodiment, a scheduler may store a dependency vector 400 for each source of each instruction operation entry in the scheduler.

As shown in FIG. 4, dependency vector 400 includes four columns and two rows. The two rows in dependency vector 400 represent two load execution pipelines in the host processor, with the top row corresponding to a first load execution pipeline and the bottom row corresponding to a second load execution pipeline. If a load executes in the first load execution pipeline and if a given source is identified as being dependent on the load, then an indication (e.g., a "1" bit or otherwise) may be written into the left-most bit (the propagate '3' bit position) of the top row of the given source's dependency vector. Similarly, if a load executes in the second load execution pipeline and if a given source is identified as being dependent on the load, then a '1' may be written into the left-most bit of the bottom row of the given source's dependency vector.

In the example shown, the four columns of each row of dependency vector 400 represent the length of the load recovery window, which is four cycles in this example for each of the load execution pipelines. The load recovery window may be equal to the number of clock cycles from when a load is speculatively issued to when the hit/miss status of the load in the processor's cache is determined. In other embodiments, the number of rows and/or the number of columns in a dependency vector may vary according to the processor architecture. Other variations of dependency vector implementations are possible and are contemplated.

The bits occupying the bit positions on the left of dependency vector 400 may be referred to as propagate bits 3, 2, and 1. The propagate bit number indicates the number of cycles until the bit becomes a kill bit. The right-most (or last) bit may be referred to as the kill bit. A dependency may be indicated with a '1' in a position within dependency vector 400, with the position correlated to the location of the producing instruction within the execution pipeline. For each clock cycle, the bits of dependency vector 400 may shift from left to right, with a '0' bit shifted into propagate bit position 3 if there is not a load executing on which the corresponding instruction source has a dependency.

When a load instruction cannot produce its data at the expected latency, a kill signal (cancel signal) may be generated and sent to the scheduler. The scheduler may search for any dependency vectors with a '1' bit in the kill bit position of the row corresponding to the load execution pipeline which generated the kill signal. Any source with a '1' bit in the kill bit position of its dependency vector 400 may be marked as unready if it was previously marked as ready, and any instruction with a source with a '1' bit in the kill bit position of its dependency vector 400 may be killed if it has already issued or marked as unready if it has not yet issued. When a given instruction issues from the scheduler, any sources of any instructions resident in the scheduler which are dependent on the given instruction may be identified. If a dependent source is identified, the bit values of the dependency vector 400 of the dependent source may be generated from the disjunction of the dependency vector 400 of the given instruction with the existing dependency vector 400 of the dependent source. It is noted that an instruction or its source may be marked as unready even if it has already issued. In some embodiments, some or all instructions may issue multiple times. Also, in some embodiments, an instruction may exist in a scheduler even after the instruction has issued.

Figure 5:
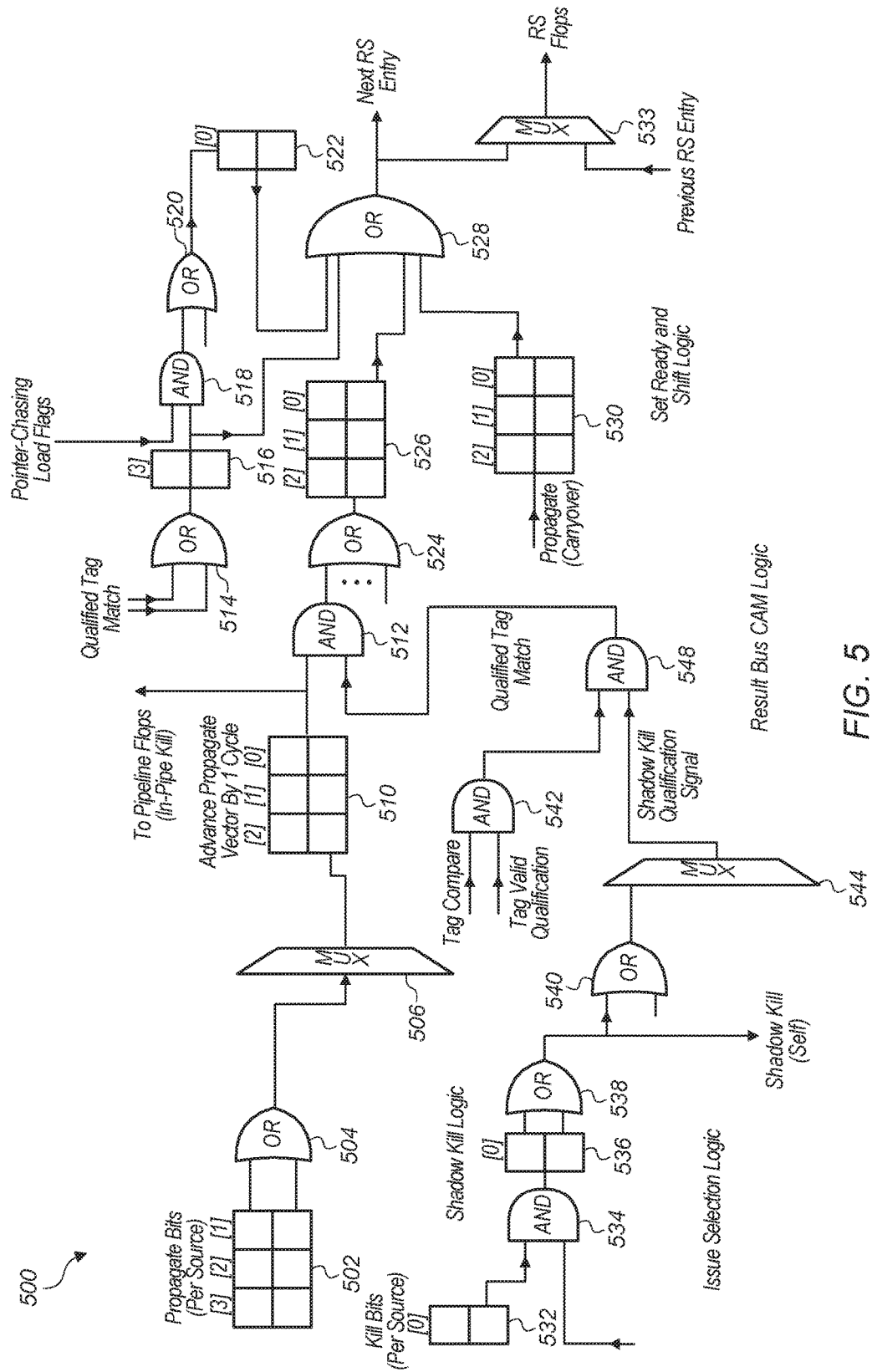
FIG. 5 is a block diagram of one embodiment of scheduler logic to process dependency vectors.

Referring now to FIG. 5, a block diagram of one embodiment of scheduler logic 500 to process dependency vectors is shown. The propagate bits 502 of the dependency vector of each source of a given instruction in the scheduler may be coupled to the input of OR-gate 504. The output of OR-gate 504 may be coupled to the input of multiplexer (mux) 506, and mux 506 may select an instruction to issue. The output of mux 506 is shown as dependency vector bits 510 which may be advanced by one cycle to shift forward the dependency indicators. Dependency vector bits 510 may be coupled to the pipeline flops (not shown) to perform an in-pipe kill if necessary. Dependency vector bits 510 may also be coupled to inputs of AND-gate 512.

The kill bits 532 of the dependency vector of each source of a given instruction may be coupled to the inputs of AND-gate(s) 534. The kill signal(s) may also be coupled to an input of AND-gate(s) 534. The output(s) of AND-gate(s) 534 may be coupled to intermediate values 536 which represent multiple shadow kill signals for a single source. Intermediate values 536 may be coupled to OR-gate 538. The output of OR-gate 538 may represent the final, combined shadow kill signal for a particular source, and the output of OR-gate 538 may be coupled to an input of OR-gate 540. The output of OR-gate 540, which may represent the final, combined shadow kill signal for a particular µop, may be coupled to mux 544, and mux 544 may select an instruction from the scheduler or a given reservation station.

The output of mux 544 is labeled the "shadow kill qualification signal" which may be coupled to an input of AND-gate 548. The other input of AND-gate 548 may be provided by AND gate 542. The inputs to AND-gate 542 may be the tag compare and tag valid qualification signals. The output of AND-gate 548 is labeled the "qualified tag match" which may be coupled to AND-gate 512. The output of AND-gate 512 may be coupled to OR-gate 524, which may perform an OR reductions for multiple result buses. The output of OR-gate 524 may be coupled to dependency vector bits 526 which may be coupled to inputs of OR-gate 528.

Qualified tag matches for multiple result buses may be coupled to the inputs of OR-gate 514, with the output of OR-gate 514 coupled to the dependency vector bits 516. Dependency vector bits 516 may be coupled to inputs of AND-gate 518 and to inputs of OR-gate 528. Pointer-chasing load flags may be coupled to the other inputs of AND-gate 518. The output of AND-gate 518 may be coupled to OR-gate 520, which may perform an OR reduction for each load execution pipeline. The output of OR-gate 520 may be coupled to dependency vector bits 522 which may be coupled to inputs of OR-gate 528. The dependency vector bits 530 may also be coupled to inputs of OR-gate 528. The output of OR-gate 528 may be coupled to mux 533 and to the next reservation station (RS) entry in the scheduler. The other input of mux 533 may be coupled from the previous reservation station entry in the scheduler. The output of mux 533 may be coupled to the reservation station flops.

It should be understood that the scheduler logic 500 shown in FIG. 5 is representative of one embodiment of the scheduler logic for processing dependency vectors. In other embodiments, other combinations and/or structures of scheduler logic may be utilized. Accordingly, one or more of the logic components shown in FIG. 5 may be omitted and/or one or more additional logic components may be added to the scheduler logic 500 shown in FIG. 5.

Figure 6:
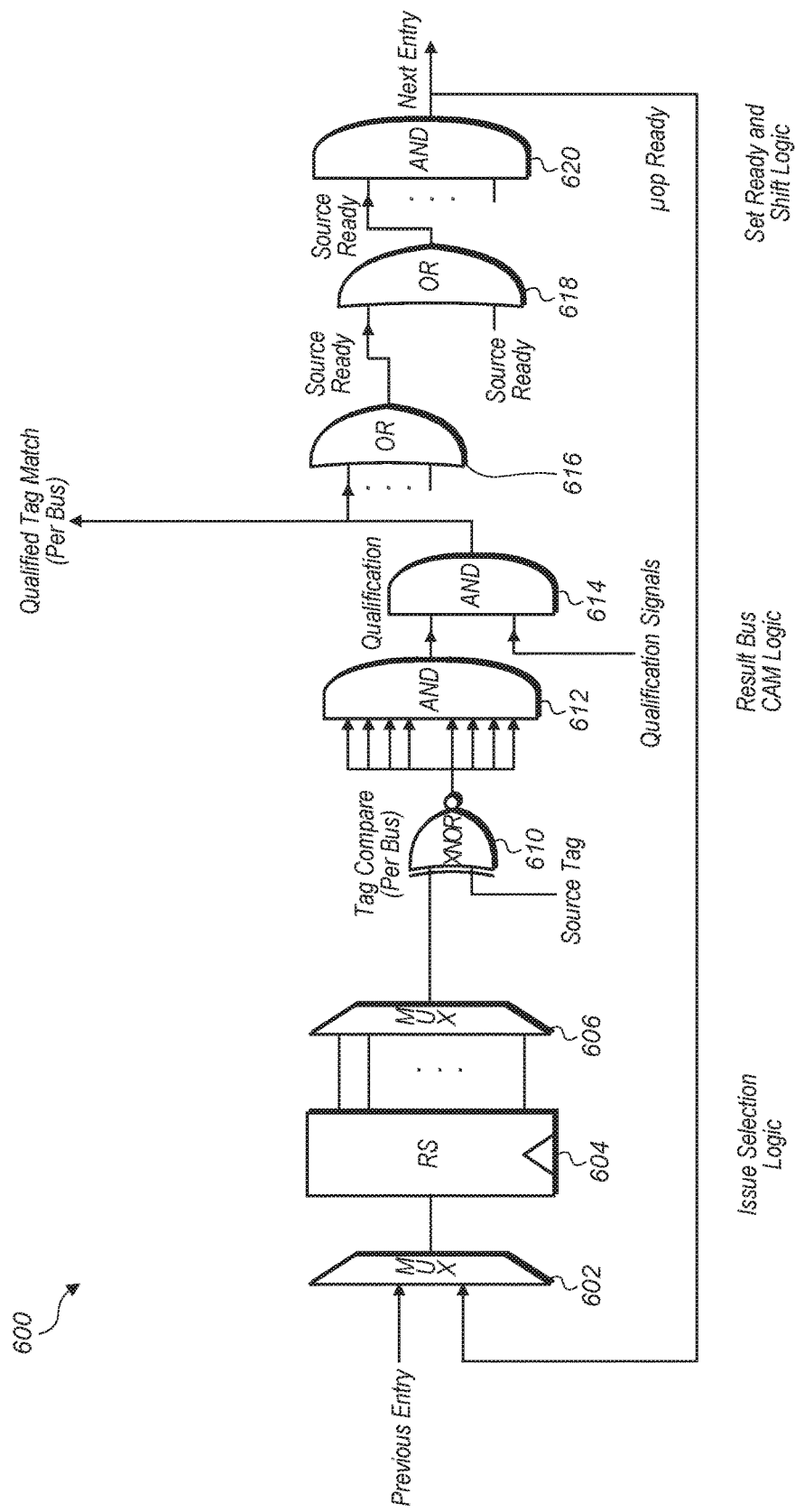
FIG. 6 is a block diagram of another embodiment of scheduler logic to process dependency vectors.

Turning now to FIG. 6, a block diagram of one embodiment of another portion of scheduler logic 600 for processing dependency vectors is shown. The previous entry and next entry of the reservation station may be coupled to the inputs of shift mux 602. The output of mux 602 may be coupled to reservation station (RS) 604. The entries of RS 604 may be coupled to mux 606 which may be configured to select an instruction operation to issue from RS 604. The output of mux 606 and the source tag from the µop being examined for wakeup may be coupled to tag comparison logic which is represented by XNOR gate 610. The outputs of the tag comparison logic may be coupled to AND-gate 612, with the output of AND-gate 612 coupled to AND-gate 614. The other inputs of AND-gate 614 may be various qualification signals.

The output of AND-gate 614 is labeled the "qualified tag match" per bus. The qualified tag match signal may be coupled to OR-gate 616, with the CAM outputs of other result buses coupled to the other inputs of OR-gate 616. The output of OR-gate 616 (labeled "source ready") may be coupled to OR-gate 618, with the output of OR-gate 618 coupled to an input of AND-gate 620. The results of comparisons of other sources of a given instruction may also be coupled to the other inputs of AND-gate 620. The output of AND-gate 620 may be the "µop ready" signal which is coupled back to mux 602.

Scheduler logic 600 may be used in combination with scheduler logic 500 to issue µops and manage dependencies between load µops and their dependent µops. It should be understood that the scheduler logic 600 shown in FIG. 6 is representative of one embodiment of the scheduler logic for processing dependency vectors. In other embodiments, other combinations and/or structures of scheduler logic may be utilized. Accordingly, one or more of the logic components shown in FIG. 6 may be omitted and/or one or more additional logic components may be added to the logic shown in FIG. 6.

Figure 7:
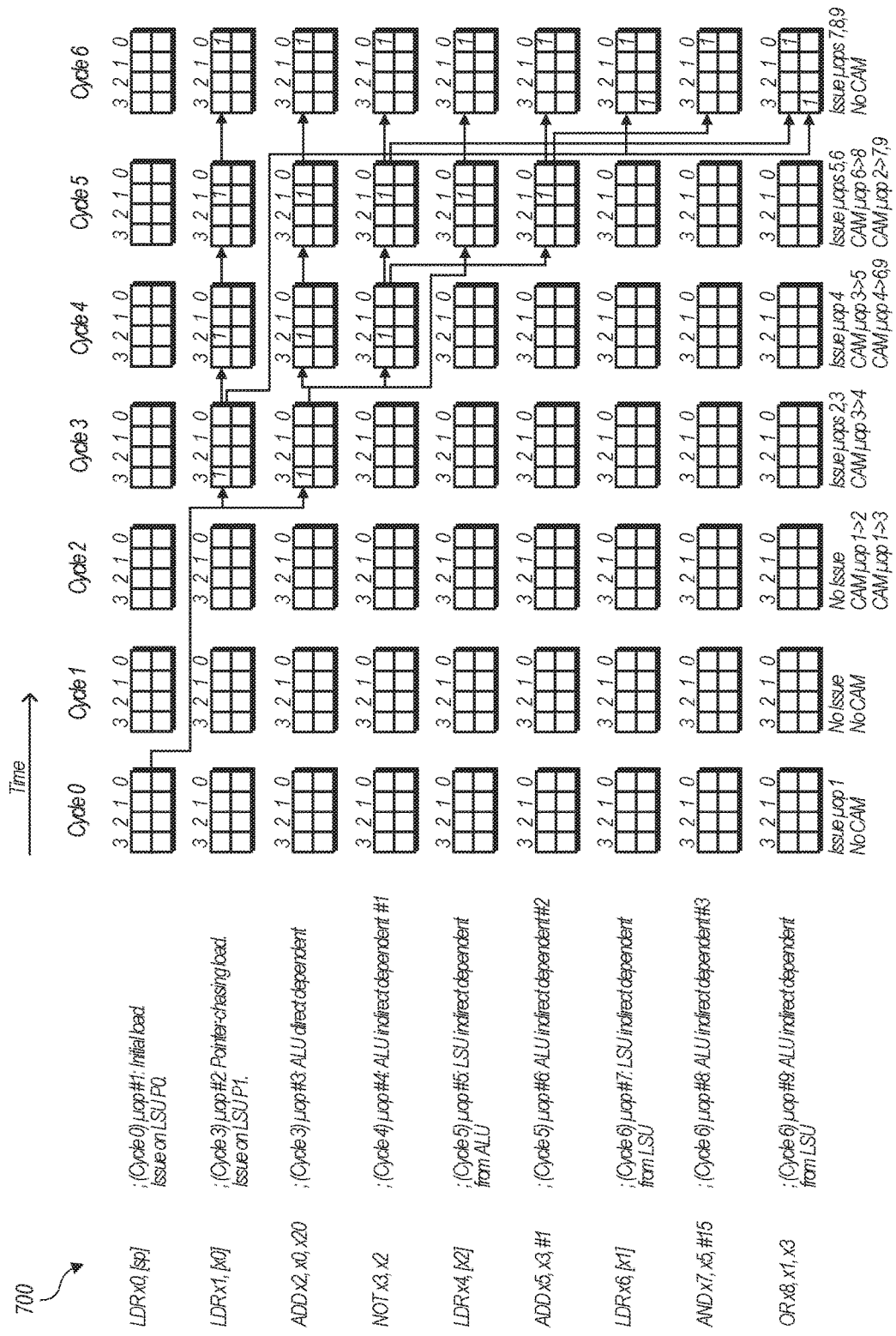
FIG. 7 is a block diagram of one embodiment of dependency vectors over multiple cycles for an instruction stream.

Referring now to FIG. 7, a block diagram of one embodiment of dependency vectors over multiple cycles for an instruction stream 700 is shown. The instruction stream 700 shown on the left-side of FIG. 7 is one example of a group of instructions which may be executed by a processor. A dependency vector for each instruction of instruction stream 700 is shown to the right of the instruction under the column corresponding to "cycle 0". Then, changes to the dependency vectors that occur in subsequent cycles are shown in the columns to the right of the original dependency vector for each instruction. Each dependency vector in a given row represents the state of the dependency vector for its corresponding instruction at the particular point in time indicated by the cycle number noted at the top of the column. In other words, each dependency vector, moving left to right, is intended to represent the previous dependency vector in a subsequent clock cycle. Clock cycles 0-6 are intended to represent seven consecutive clock cycles. It may be assumed for the purposes of this discussion that there are two load execution pipelines (load-store unit (LSU) P0 and LSU P1) on which a load µop could execute. It may also be assumed for the purposes of this discussion that the load recovery window is four cycles. Accordingly, each dependency vector shown in FIG. 7 has four columns and two rows. In other embodiments, other sizes of dependency vectors may be utilized.

The first instruction operation (or µop) of instruction stream 700 is (LDR x0, [sp]), which is also labeled as µop #1. µop #1 may be issued on load execution pipeline 0 (or load-store unit LSU P0) in cycle 0. Since µop #2 (LDR x1, [x0]) and µop #3 (ADD x2, x0, x20) are dependent on µop #1, they may not be issued until cycle 3. It may be assumed for the purposes of this discussion that the earliest a load can produce data for a dependent µop is 3 cycles later. In other embodiments, the earliest that a load is able to produce data for a dependent µop may be more or less than 3 cycles. Tag comparison wakeups may be performed in cycle 2 to wakeup µops #2 and #3 based on the dependencies between µop #1 and µop #2 and µop #1 and µop #3.

In cycle 3, when µop #2 is issued on LSU P1 and µop #3 is issued on an arithmetic logic unit (ALU), the earliest bit of the top row of the dependency vectors for µop #2 and µop #3 may be set to '1' to indicate the dependency on µop #1. It may be assumed for the purposes of this discussion that the top row of the dependency vectors in FIG. 7 represents load execution pipeline 0 (or LSU P0) and the bottom row of the dependency vectors represents load execution pipeline 1 (or LSU P1). A tag comparison wakeup may be performed in cycle 3 to wakeup µop #4 based on the dependency between µop #3 and µop #4 detected during a content-addressable-memory (CAM) search. Then, µop #4 (NOT x3, x2) may be issued in cycle 4. Since µop #4 is dependent on µop #3, the dependency vector of µop #4 may be updated using the disjunction of the dependency vector of µop #3 with the previous dependency vector of µop #4, and then the bits of the dependency vector may be shifted one bit forward (to the right). Since the previous dependency vector of µop #4 did not have any set bits, effectively what is happening is that the dependency vector of µop #3 is being copied into the dependency vector of µop #4 and then shifted one bit position to the right. Also in cycle 4, the dependency vectors for µop #2 and µop #3 may be shifted forward, with the dependency indicator moving one bit position to the right in each of their dependency vectors. In cycle 4, a tag comparison wakeup may be performed to wakeup µop #5 based on the dependency between µop #3 and µop #5, and tag comparison wakeups may be performed to wakeup µops #6 and #9 based on the dependencies between µop #4 and µop #6 and between µop #4 and µop #9.

Then, in cycle 5, µop #5 (LDR x4, [x2]) and µop #6 (ADD x5, x3, #1) may be issued. Accordingly, the dependency vector of µop #5 may be updated with the disjunction of the dependency vector of µop #3 and the previous dependency vector of µop #5. Also, the dependency vector of µop #6 may be updated with the disjunction of the dependency vector of µop #4 and the previous dependency vector of µop #6. Then, the dependency vectors for µop #5 and µop #6 may be shifted forward in cycle 5, with the previously set dependency indicator moving one bit position to the right in both of their dependency vectors. Also, the dependency vectors for µops #2-4 may be shifted forward in cycle 5, with the dependency indicator moving one bit position to the right in their dependency vectors. In cycle 5, a tag comparison wakeup may be performed to wakeup µop #8 based on the dependency between µop #6 and µop #8 and tag comparison wakeups may be performed to wakeup µops #7 and #9 based on the dependencies between µop #2 and µop #7 and between µop #2 and µop #9

Next, in cycle 6, μop #7 (LDR x6, [x1]), μop #8 (AND x7, x5, #15), and μop #9 (OR x8, x1, x3) may be issued. Accordingly, the dependency vector of μop #7 may be updated with the disjunction of the dependency vector of μop #2 with the previous dependency vector of μop #7 and then shifted forward one bit. Also, since μop #2 is a load μop, then a '1' bit may be inserted into the earliest bit of the second row (corresponding to LSU P1) of the dependency vector of μop #7. The dependency vector of μop #8 may be updated with the disjunction of the dependency vector of μop #6 with the previous dependency vector of μop #8 and then shifted forward one bit. Additionally, the dependency vector of μop #9 may be updated with the disjunction of the dependency vector of μop #2 with the previous dependency vector of μop #9 and then shifted forward one bit. Also, since μop #2 is a load μop, then a '1' bit may be inserted into the earliest bit of the second row of the dependency vector of μop #9. Still further, the dependency vectors for μops #2-6 may be shifted forward in cycle 6, with the dependency indicator moving one bit position to the right in their dependency vectors.

If a kill signal were to be generated for μop #1 in cycle 6, in response to determining that μop #1 missed in the cache, then the scheduler would look at the kill bit (or '0' bit) position of the first row of each dependency vector of each instruction entry in the scheduler. As shown in the column under cycle 6, there are eight separate instructions with a kill bit in the first row of their dependency vector, which indicates these instructions are directly or indirectly dependent on μop #1. Accordingly, all eight of these instructions would be killed if a kill signal were generated for μop #1 in cycle 6. The logic for killing all eight of these instructions is simplified by having a simple mechanism to detect a direct or indirect dependency on μop #1, which allows for a much faster kill to be performed. If a kill signal is not generated for μop #1 in cycle 6, then the set bits in the kill bit positions of μops 2-9 will shift out of their dependency vectors in cycle 7, and μops 2-9 can continue to execute unless they are cancelled by another dependency (direct or indirect) on a different load μop.

Figure 8:
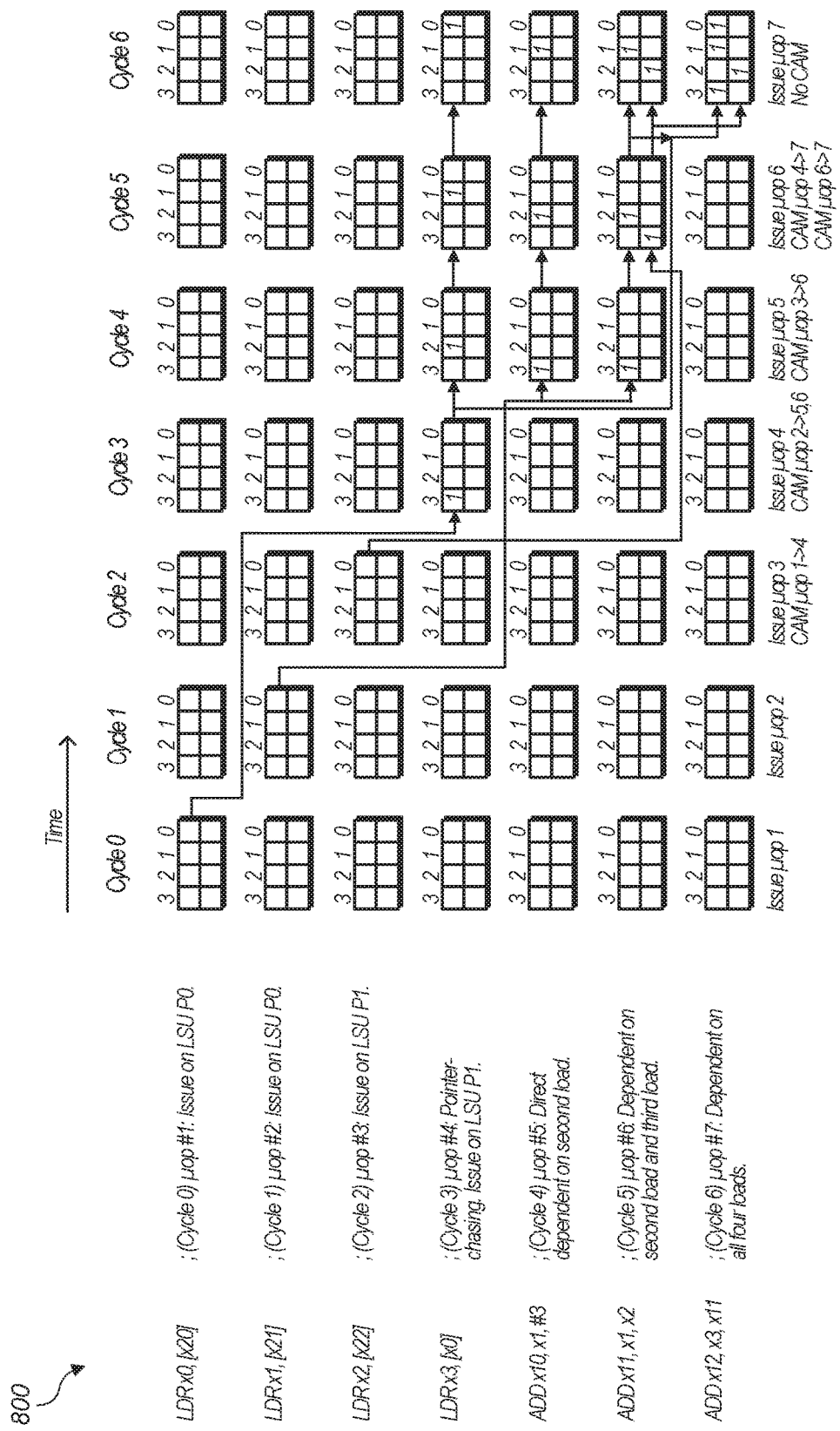
FIG. 8 is a block diagram of another embodiment of dependency vectors over multiple cycles for an instruction sequence.

Turning now to FIG. 8, a block diagram of another embodiment of dependency vectors over multiple cycles for an instruction sequence 800 is shown. The instruction stream 800 shown on the left-side of FIG. 8 is one example of a group of instructions which may be executed by a processor. Similar to the diagram in FIG. 7, a dependency vector for each instruction of instruction stream 800 is shown to the right of the instruction under the column corresponding to "cycle 0". Then, changes to the dependency vectors that occur in subsequent cycles are shown in the columns to the right of the original dependency vector for each instruction. Clock cycles 0-6 are intended to represent seven consecutive clock cycles. It may be assumed for the purposes of this discussion that there are two load execution pipelines (LSU P0 and LSU P1) on which a load μop could execute. It may also be assumed for the purposes of this discussion that the load recovery window is four cycles. Accordingly, each dependency vector has four columns and two rows. In other embodiments, other sizes of dependency vectors may be utilized.

The first instruction operation (or μop) of instruction stream 800 is μop #1 (LDR x0, [x20]). μop #1 may be issued on load execution pipeline 0 (or LSU P0) in cycle 0. μop #2 (LDR x1, [x21]) may be issued on LSU P1 in cycle 1 since μop #2 does not have a dependency on μop #1. μop #3 (LDR x2, [x22]) may be issued on LSU P1 in cycle 2 since μop #3 does not have a dependency on μop #1 or μop #2. In cycle 2, a tag comparison wakeup may be performed to wakeup μop #4 (LDR x3, [x0]) based on the dependency between μop #1 and μop #4. μop #4 may be issued on LSU P1 in cycle 3 and the earliest bit of the top row of the dependency vector of μop #4 may be set to indicate the dependency on μop #1. In cycle 3, a tag comparison wakeup may be performed to wakeup μop #5 (ADD x10, x1, #3) based on the dependency between μop #2 and μop #5 and a tag comparison may discover the dependency between μop #2 and μop #6 (ADD x11, x1, x2).

Then, μop #5 may be issued in cycle 4 and the earliest bit of the top row of the dependency vector of μop #5 may be set to indicate the dependency on μop #2. Also, the earliest bit of the top row of the dependency vector of μop #6 may be set to indicate the dependency on μop #2. Even though μop #6 does not issue in cycle 4, its dependency vector may be updated with the μop #2 dependency bit in response to discovering the dependency to μop #2 and since μop #2 issued three cycles prior in cycle 1. The dependency vector for μop #4 may be shifted forward in cycle 4, with the dependency indicator in the top row moving one bit position to the right. In cycle 4, a tag comparison wakeup may be performed to wakeup μop #6 based on the dependency between μop #3 and μop #6.

Then, μop #6 may be issued in cycle 5 and the previous dependency vector of μop #6 (from the column labeled "cycle 4") may be shifted one-bit to the right in cycle 5. Additionally, the earliest bit of the bottom row of the dependency vector of μop #6 may be set to indicate the dependency on μop #3. Also, the dependency vectors for μop #4 and μop #5 may be shifted forward in cycle 5, with the dependency indicator moving one bit position to the right in both of their dependency vectors. In cycle 5, a tag comparison wakeup may be performed to wakeup μop #7 (ADD x12, x3, x11) based on the dependencies between μop #4 and μop #7 and between μop #6 and μop #7.

Then, μop #7 may be issued in cycle 6 and the dependency vector of μop #7 may be updated with the disjunction of the dependency vectors of μop #4 and μop #6 shifted one bit position to the right. Additionally, the earliest bit of the top row of the dependency vector of μop #7 may be set to indicate the direct dependency on μop #4. Also, the dependency vectors for μop #4, μop #5, and μop #6 may be shifted forward in cycle 6, with the dependency indicator moving one bit position to the right in both of their dependency vectors.

If a kill signal were to be generated for μop #1 in cycle 6, in response to determining μop #1 missed in the cache, then the scheduler would look at the kill bit position of the first row of each dependency vector of each instruction entry in the scheduler. As shown in the dependency vector column under the label "cycle 6", there are two separate instructions (μop #4 and μop #7) with a kill bit in the first row of their dependency vector, which indicates these instructions are directly or indirectly dependent on μop #1. Accordingly, μop #4 and μop #7 would be killed if a kill signal were generated for μop #1 in cycle 6. If a kill signal is not generated for μop #1 in cycle 6, then the set bits in the kill bit positions of μops #4 and #7 will shift out of their dependency vectors in cycle 7, and μops #4 and #7 can continue to execute. μop #4 has no other dependencies as indicated by its dependency vector, but μop #7 still has other dependencies which may cause it to be cancelled by other load μops in later clock cycles. By using the dependency vector approach, multiple levels of dependencies may be indicated simultaneously, and the timing of the dependencies may be preserved over time as the dependency indicators are shifted one bit position forward for each clock cycle.

Figure 9:
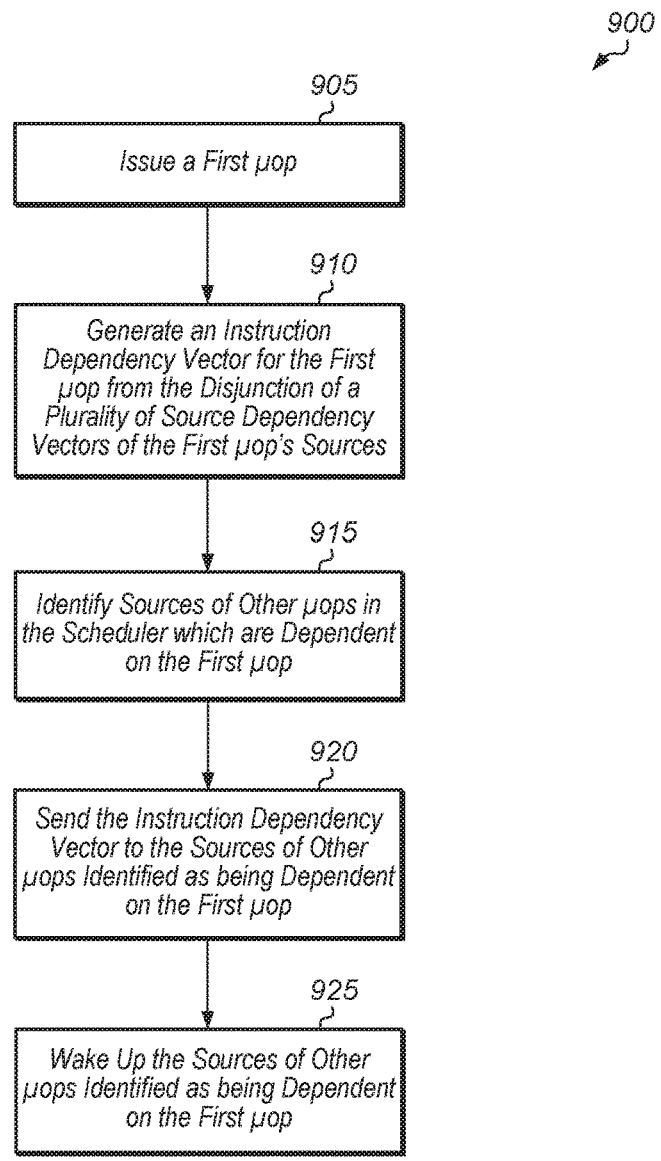
FIG. 9 is a generalized flow diagram illustrating one embodiment of a method for broadcasting a dependency vector.

Referring now to FIG. 9, one embodiment of a method 900 for broadcasting a dependency vector is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems and/or apparatuses described herein may be configured to implement method 900.

A first μop may be issued from a scheduler to an execution unit of a processor (block 905). In various embodiments, the processor may be included within a host device, wherein the host device is a smartphone, tablet, laptop computer, desktop computer, watch, server, programmable consumer electronic device, set-top box, television, satellite receiver, or other electronic device or computing system. In response to issuing the first μop, an instruction dependency vector may be generated for the first μop from the disjunction of a plurality of source dependency vectors of the first μop's sources (block 910). Calculating the disjunction of the plurality of source dependency vectors entails performing an OR operation for each (row, column) bit of the source dependency vector with corresponding (row, column) bits of all of the source dependency vectors. In one embodiment, the instruction dependency vector may be generated in the same clock cycle that the first μop is issued. If the first μop only has a single source, then the instruction dependency vector will be the same as the source dependency vector.

Next, sources of other μops in the scheduler which are dependent on the first μop may be identified (block 915). Then, the instruction dependency vector may be sent to the sources of other μops which have been identified as being dependent on the first μop (block 920). Next, the sources of other μops which are dependent on the first μop may be woken up (block 925). It is noted that in some cases, a source which is dependent on the first μop may be woken up one or more clock cycles after the first μop is issued. In some cases, the cycle during which a source is woken up may depend on how quickly the corresponding μop is able to issue after the first μop. For example, if a second μop is able to issue three cycles after the first μop issues, then a source of the second μop (if it is dependent on the first μop) may be woken up two cycles after the first μop issues so that the second μop may be issued in the subsequent cycle (if all other sources of the second μop have also been woken up). After block 925, method 900 may end.

Figure 10:
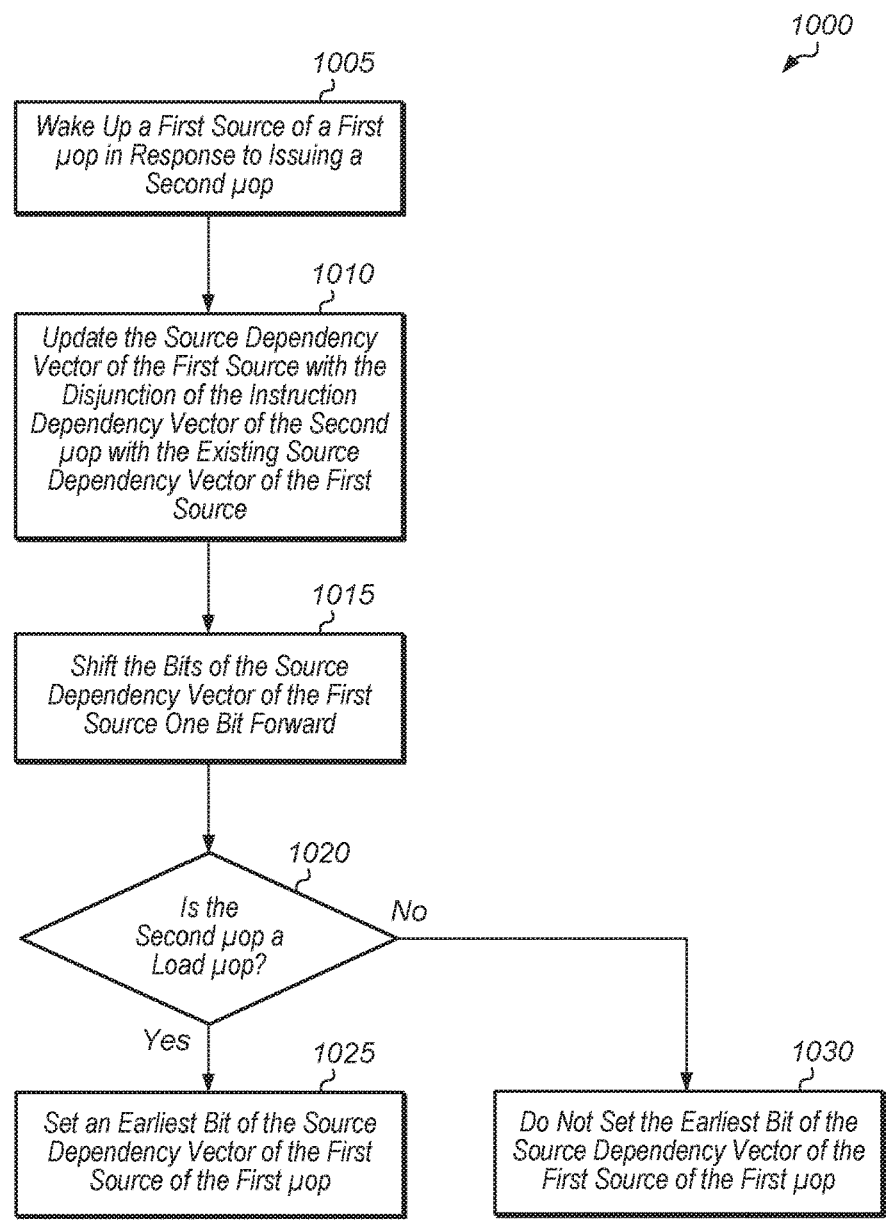
FIG. 10 is a generalized flow diagram illustrating one embodiment of a method for maintaining dependency vectors.

Turning now to FIG. 10, one embodiment of a method 1000 for maintaining dependency vectors is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems and/or apparatuses described herein may be configured to implement method 1000.

A first source of a first μop may be woken up in response to issuing a second μop to an execution unit of a processor (block 1005). It may be assumed for the purposes of this discussion that the first source of the first μop is dependent on the second μop. In various embodiments, the processor may be included within a host device, wherein the host device is a smartphone, tablet, laptop computer, desktop computer, watch, server, programmable consumer electronic device, set-top box, television, satellite receiver, or other electronic device or computing system. In response to waking up the first source of the first μop, the source dependency vector of the first source of the first μop may be updated with the disjunction of the instruction dependency vector of the second μop and the existing source dependency vector of the first source of the first μop (block 1010). Next, the bits of the source dependency vector of the first source of the first μop may be shifted one bit forward (block 1015). In one embodiment, bits may be shifted forward from left to right.

Next, if the second μop is a load μop (conditional block 1020, "yes" leg), then an earliest bit of the source dependency vector of the first source of the first μop may be set (block 1025). In one embodiment, the earliest bit may be set in the row of the source dependency vector corresponding to the load execution unit to which the second μop was issued. The source dependency vector of the first source of the first μop may include a row for each load execution unit in the processor. If the second μop is not a load μop (conditional block 1020, "no" leg), then the earliest bit of the source dependency vector of the first source of the first μop may not be set (block 1030). After blocks 1025 and 1030, method 1000 may end.

Figure 11:
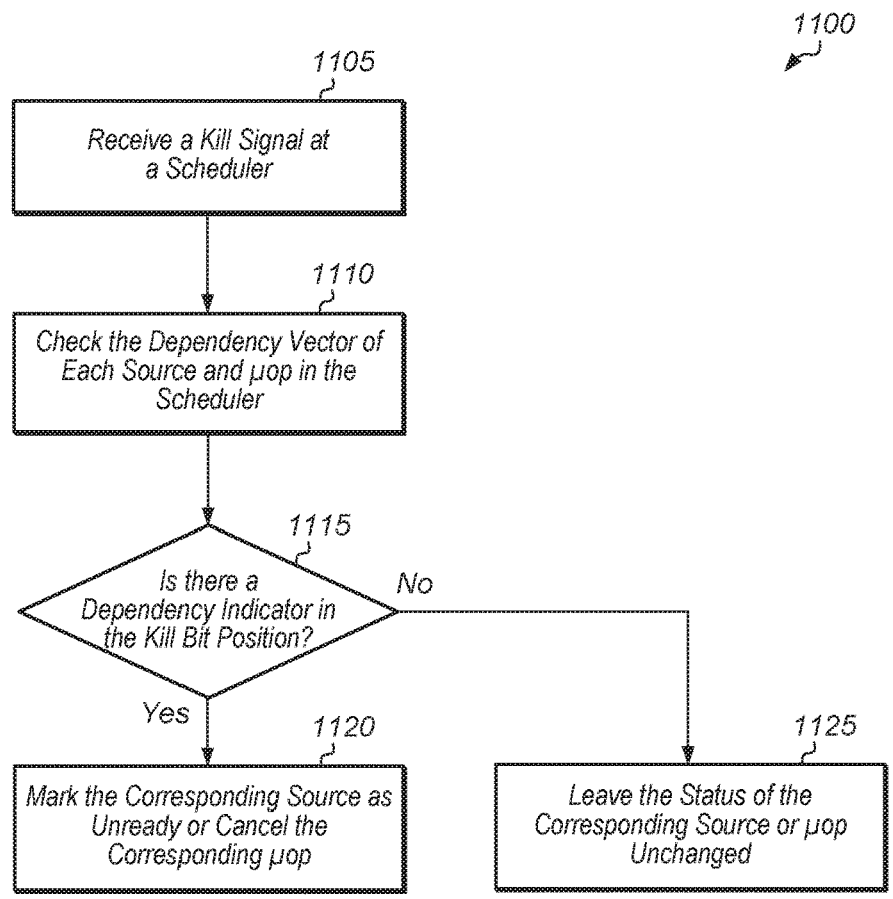
FIG. 11 is a generalized flow diagram illustrating one embodiment of a method for processing a kill signal.

Referring now to FIG. 11, one embodiment of a method 1100 for processing a kill signal is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems and/or apparatuses described herein may be configured to implement method 1100.

A kill signal may be received at a scheduler of a processor (block 1105). In various embodiments, the processor may be included within a host device, wherein the host device is a smartphone, tablet, laptop computer, desktop computer, watch, server, programmable consumer electronic device, set-top box, television, satellite receiver, or other electronic device or computing system. Depending on the embodiment, the kill signal may be generated when a load is not able to produce its data at a predicted latency, or the kill signal may be generated when one or more other instructions are cancelled for any of various reasons. In response to receiving the kill signal, the scheduler may check the dependency vector of each source and each μop in the scheduler (block 1110).

Then, for each dependency vector, if there is a dependency indicator (e.g., '1' bit) in the kill bit position of the dependency vector (conditional block 1115, "yes" leg), then the corresponding source or μop may be marked as unready (for the source) or cancelled (for the μop) (block 1120). If a given μop has already been issued and the given μop has a dependency indicator in the kill bit position of its dependency vector, then the given μop may be flushed from its execution pipeline and not produce a result. If there is not a dependency indicator in the kill bit position of the dependency vector (conditional block 1115, "no" leg), then the scheduler may leave the status of the corresponding source or μop unchanged (block 1125). It is noted that if a source or μop has a dependency indicator in one or more earlier bit positions of its dependency vector without having a dependency indicator in the kill bit position, the source or μop will have its status remain the same when the kill signal is generated and received by the scheduler. The dependency indicators in earlier bit positions correspond to other μops which started executing subsequent to the µop which generated the kill signal, and these other µops may potentially generate a kill signal in a later clock cycle if they are unable to produce data at the expected latency. After blocks 1120 and 1125, method 1100 may end.

Figure 12:
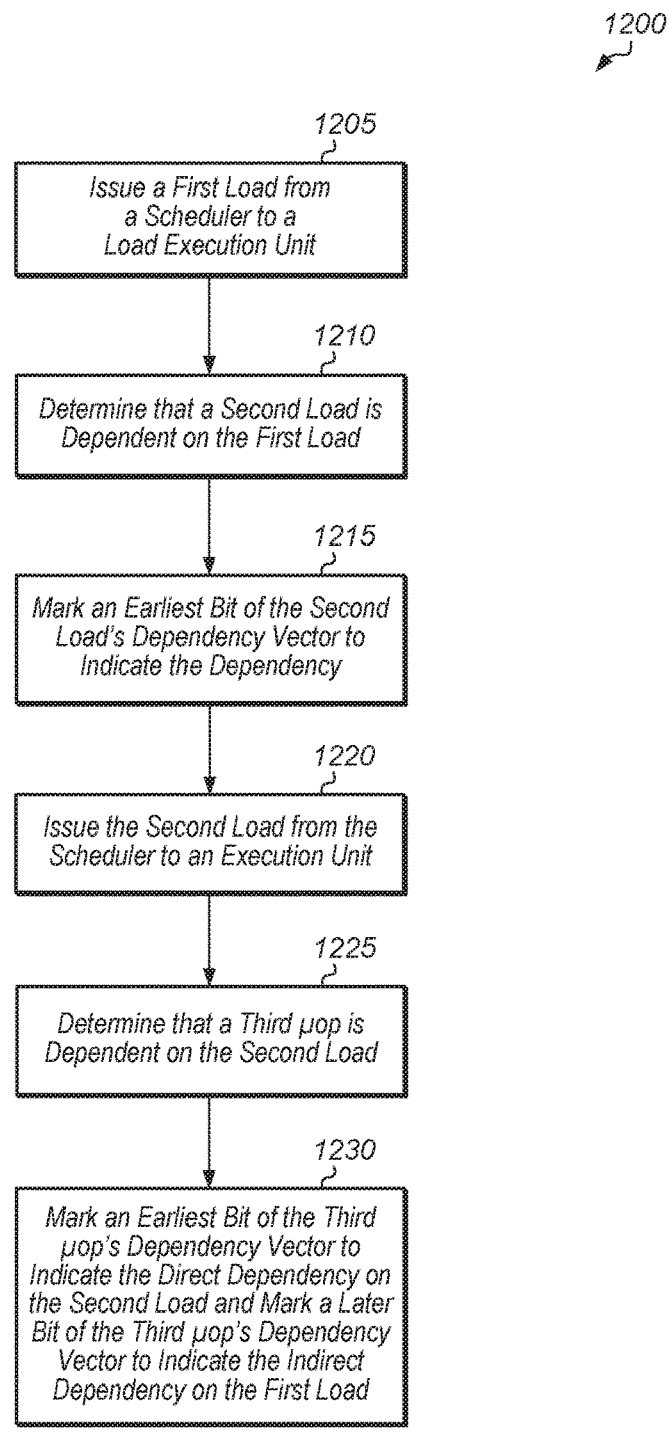
FIG. 12 is a generalized flow diagram illustrating another embodiment of a method for simultaneously marking multiple dependencies.

Turning now to FIG. 12, one embodiment of a method 1200 for simultaneously marking multiple dependencies is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems and/or apparatuses described herein may be configured to implement method 1200.

A first load may be issued from a scheduler to a load execution unit of a processor (block 1205). In various embodiments, the processor may be included within a host device, wherein the host device is a smartphone, tablet, laptop computer, desktop computer, watch, server, programmable consumer electronic device, set-top box, television, satellite receiver, or other electronic device or computing system. The scheduler may then determine that a second load is dependent on the first load (block 1210). In response to determining that the second load is dependent on the first load, the scheduler may mark an earliest bit of the second load's dependency vector to indicate the dependency (block 1215).

At a later point in time, the second load may be issued from the scheduler to a load execution unit (block 1220). Depending on the embodiment, the second load may be issued to the same load execution unit to which the first load was issued or the second load may be issued to a different load execution unit from the unit to which the first load was issued. Next, the scheduler may identify a third µop which is dependent on the second load (block 1225). In response to determining that the third µop is dependent on the second load, the scheduler may mark an earliest bit of the third µop's dependency vector to indicate the direct dependency on the second load, and the scheduler may mark a later bit of the third µop's dependency vector to indicate the indirect dependency on the first load (block 1230). It is noted that the scheduler may simultaneously (i.e., in the same clock cycle) mark an earliest bit of the third µop's dependency vector to indicate the direct dependency on the second load, and scheduler may mark a later bit of the third µop's dependency vector to indicate the indirect dependency on the first load. The earliest bit of the third µop's dependency vector refers to a first column of the third µop's dependency vector, and the later bit of the third µop's dependency vector refers to a later column (e.g., second column, third column, fourth column) of the third µop's dependency vector. Method 1200 illustrates one example of a dependency vector having multiple bits set at the same time. Other examples of simultaneously setting multiple bits of a dependency vector to indicate multiple direct and/or indirect dependencies are possible and are contemplated. After block 1230, method 1200 may end.

Figure 13:
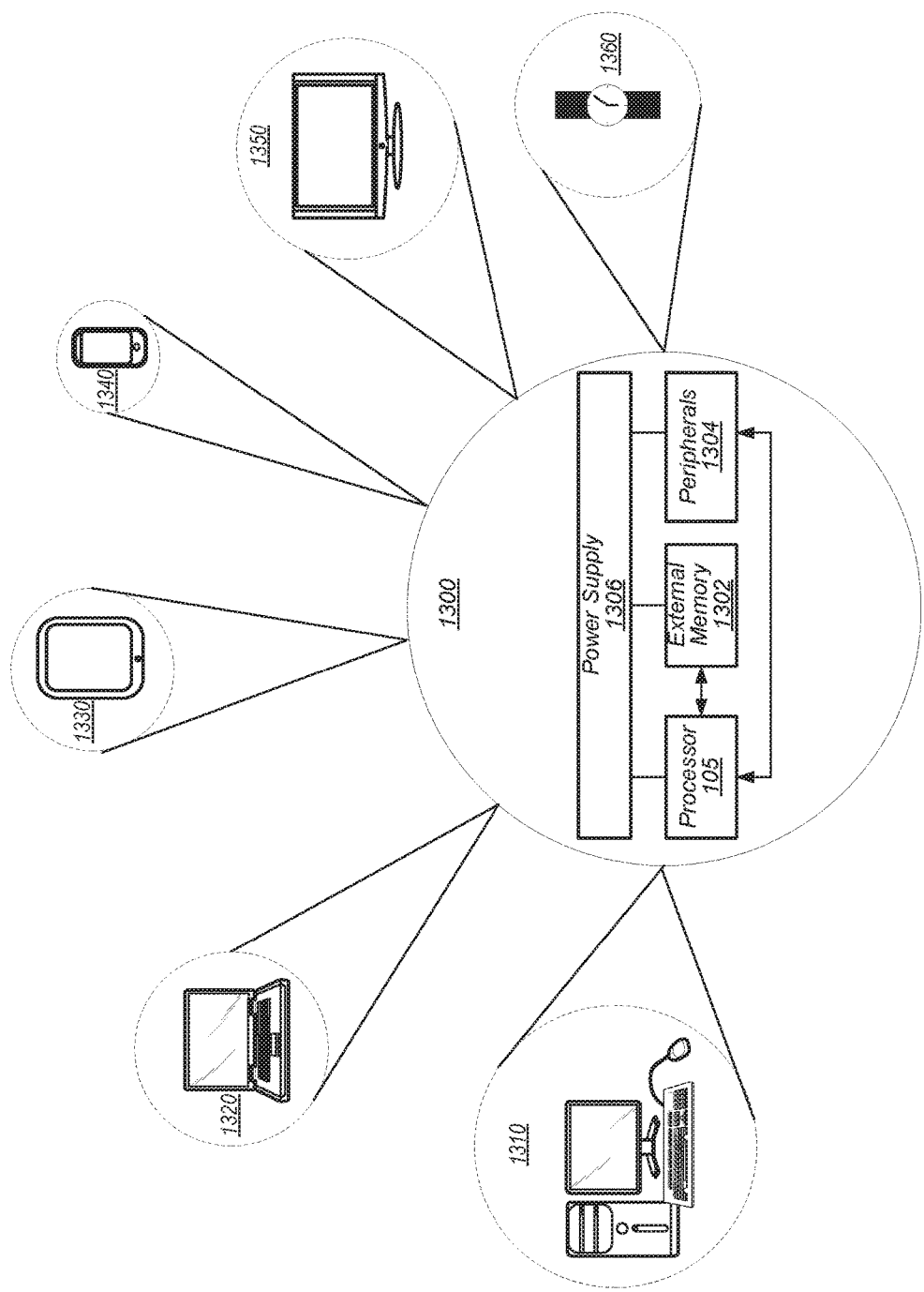
FIG. 13 is a block diagram of one embodiment of a system.

Referring next to FIG. 13, a block diagram of one embodiment of a system 1300 is shown. As shown, system 1300 may represent chip, circuitry, components, etc., of a desktop computer 1310, laptop computer 1320, tablet computer 1330, cell or mobile phone 1340, television 1350 (or set top box configured to be coupled to a television), wrist watch or other wearable item 1360, or otherwise. Other devices are possible and are contemplated. In the illustrated embodiment, the system 1300 includes at least one instance of CPU 105 (of FIG. 1) coupled to an external memory 1302. In various embodiments, CPU 105 may be included within a system on chip (SoC) or integrated circuit (IC) which is coupled to external memory 1302, peripherals 1304, and power supply 1306.

CPU 105 is coupled to one or more peripherals 1304 and the external memory 1302. A power supply 1306 is also provided which supplies the supply voltages to CPU 105 as well as one or more supply voltages to the memory 1302 and/or the peripherals 1304. In various embodiments, power supply 1306 may represent a battery (e.g., a rechargeable battery in a smart phone, laptop or tablet computer). In some embodiments, more than one instance of CPU 105 may be included (and more than one external memory 1302 may be included as well).

The memory 1302 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an SoC or IC containing CPU 105 in a chip-on-chip configuration, a package-on-package configuration, or a multi-chip module configuration.

The peripherals 1304 may include any desired circuitry, depending on the type of system 1300. For example, in one embodiment, peripherals 1304 may include devices for various types of wireless communication, such as wife, Bluetooth, cellular, global positioning system, etc. The peripherals 1304 may also include additional storage, including RAM storage, solid state storage, or disk storage. The peripherals 1304 may include user interface devices such as a display screen, including touch display screens or multitouch display screens, keyboard or other input devices, microphones, speakers, etc.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computer during use to provide the program instructions and accompanying data to the computer for program execution. In some embodiments, a synthesis tool reads the program instructions in order to produce a netlist comprising a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A processor comprising:
one or more execution units; and
a scheduler configured to schedule instruction operations
for execution on the one or more execution units;

wherein the processor is configured to:
  maintain a first dependency vector for a first instruction operation, wherein the first dependency vector comprises one or more bits stored in one or more propagate bit positions and one or more cancel bit positions;
  mark an earliest bit of the first dependency vector to indicate a dependency of the first instruction operation on a second instruction operation; and
  for each clock cycle the second instruction operation executes, shift bits of the first dependency vector from the one or more propagate bit positions toward the one or more cancel bit positions; and
  cancel the first instruction operation responsive to receiving a cancel signal and determining a bit of the dependency vector has been shifted into a cancel bit position of the one or more cancel bit positions.

2. The processor as recited in claim 1, wherein the second instruction operation is a load instruction operation.

3. The processor as recited in claim 2, wherein the processor is configured to maintain a plurality of dependency vectors for the first instruction, wherein each of the plurality of dependency vectors corresponds to a different load execution pipeline of the processor.

4. The processor as recited in claim 3, wherein the processor is further configured to update a source dependency vector of a source of a third instruction operation with a disjunction of the instruction dependency vector and an existing source dependency vector of the third instruction operation responsive to determining the third instruction operation is dependent on the second instruction operation.

5. The processor as recited in claim 1, wherein the processor is further configured to create an instruction dependency vector for the second instruction operation from a disjunction of a plurality of source dependency vectors corresponding to sources of the second instruction operations responsive to issuing the second instruction operation to an execution unit.

6. The processor as recited in claim 1, wherein the first dependency vector comprises a row for each load execution unit of the one or more execution units, and wherein the processor is further configured to cancel the first instruction operation responsive to receiving a cancel signal associated with a first load execution unit and responsive to determining that there is a dependency indicator in the cancel bit position of a first row of the first dependency vector, wherein the first row corresponds to the first load execution unit.

7. The processor as recited in claim 1, wherein each of the one or more cancel bit positions of the dependency vector corresponds to a single stage of an execution pipeline.

8. The processor as recited in claim 1, wherein a position of a given bit of the dependency vector in a propagate bit position indicates a number of cycles until the given bit becomes a kill bit.

9. A method comprising:
  maintaining a first dependency vector for a first instruction operation, wherein the first dependency vector comprises one or more bits stored in one or more propagate bit positions and one or more cancel bit positions;
  marking an earliest bit of the first dependency vector to indicate a dependency of the first instruction operation on a second instruction operation; and
  for each clock cycle the second instruction operation executes, shifting bits of the first dependency vector from the one or more propagate bit positions toward the one or more cancel bit position;
  cancelling the first instruction operation responsive to receiving a cancel signal and determining a bit of the dependency vector has been shifted into a cancel bit position of the one or more cancel bit positions.

10. The method as recited in claim 9, wherein the second instruction operation is a load instruction operation.

11. The method as recited in claim 10, further comprising maintaining a plurality of dependency vectors for the first instruction, wherein each of the plurality of dependency vectors corresponds to a different load execution pipeline of the processor.

12. The method as recited in claim 11, further comprising updating a source dependency vector of a source of a third instruction operation with a disjunction of the instruction dependency vector and an existing source dependency vector of the third instruction operation responsive to determining the third instruction operation is dependent on the second instruction operation.

13. The method as recited in claim 9, further comprising creating an instruction dependency vector for the second instruction operation from a disjunction of a plurality of source dependency vectors corresponding to sources of the second instruction operations responsive to issuing the second instruction operation to an execution unit.

14. The method as recited in claim 9, further comprising canceling the first instruction operation responsive to receiving a cancel signal and determining that there is a dependency indicator in the cancel bit position of the first dependency vector.

15. The method as recited in claim 9, wherein the first dependency vector comprises a row for each load execution unit of the one or more execution units, wherein the method further comprising canceling the first instruction operation responsive to receiving a cancel signal associated with a first load execution unit and responsive to determining that there is a dependency indicator in the cancel bit position of a first row of the first dependency vector, wherein the first row corresponds to the first load execution unit.

16. A computing system comprising:
  a memory; and
  a processor comprising:
    one or more execution units; and
    a scheduler configured to schedule instruction operations for execution on the one or more execution units;
  wherein the processor is configured to:
    maintain a first dependency vector for a first instruction operation, wherein the first dependency vector comprises one or more bits stored in one or more propagate bit positions and one or more cancel bit positions;
    mark an earliest bit of the first dependency vector to indicate a dependency of the first instruction operation on a second instruction operation; and
    for each clock cycle the second instruction operation executes, shift bits of the first dependency vector from the one or more propagate bit positions toward the one or more cancel bit position;
    cancel the first instruction operation responsive to receiving a cancel signal and determining a bit of the dependency vector has been shifted into a cancel bit position of the one or more cancel bit positions.

17. The computing system as recited in claim 16, wherein the processor is further configured to create an instruction dependency vector for the second instruction operation from a disjunction of a plurality of source dependency vectors corresponding to sources of the second instruction operations responsive to issuing the second instruction operation to an execution unit.

18. The computing system as recited in claim 16, wherein the second instruction operation is a load instruction operation.

19. The computing system as recited in claim 18, wherein the processor is further configured to maintain a plurality of dependency vectors for the first instruction, wherein each of the plurality of dependency vectors corresponds to a different load execution pipeline of the processor.

20. The computing system as recited in claim 19, wherein the processor is further configured to update a source dependency vector of a source of a third instruction operation with a disjunction of the instruction dependency vector and an existing source dependency vector of the third instruction operation responsive to determining the third instruction operation is dependent on the second instruction operation.

21. The computing system as recited in claim 20, wherein the processor is further configured to cancel the first instruction operation responsive to receiving a cancel signal and determining that there is a dependency indicator in the cancel bit position of the first dependency vector.

* * * * *

UNITED STATES PATENT AND TRADEMARK OFFICE
CERTIFICATE OF CORRECTION

PATENT NO. : 10,514,925 B1  
APPLICATION NO. : 15/009614  
DATED : December 24, 2019  
INVENTOR(S) : Sean M. Reynolds Page 1 of 1

It is certified that error appears in the above-identified patent and that said Letters Patent is hereby corrected as shown below:

In the Claims

Column 21, Claim 9, Line 67, please delete "bit position" and substitute -- bit positions --.

Column 22, Claim 16, Line 58, please delete "bit position" and substitute -- bit positions --.

Signed and Sealed this  
Twenty-first Day of January, 2020

Andrei Iancu  
*Director of the United States Patent and Trademark Office*